United States Patent [19]

Brown

[11] Patent Number: 4,646,021

[45] Date of Patent: Feb. 24, 1987

[54] COMPUTER-LINKED NUCLEAR MAGNETIC LOGGING TOOL AND METHOD HAVING SLOWLY RISING POLARIZING FIELD TURN-ON SEGMENTS FOR RAPIDLY DISPERSING PRECESSING COMPONENTS OF RESIDUAL POLARIZATION ASSOCIATED WITH A PRIOR-IN-TIME NML COLLECTION CYCLE

[75] Inventor: Robert J. S. Brown, Seal Beach, Calif.

[73] Assignee: Chevron Research Company, San Francisco, Calif.

[21] Appl. No.: 761,441

[22] Filed: Jul. 31, 1985

[51] Int. Cl.[4] ............................................. G01R 33/20
[52] U.S. Cl. ...................................... 324/303; 324/311
[58] Field of Search ............... 324/300, 303, 307, 309, 324/310, 311, 312

[56] References Cited

U.S. PATENT DOCUMENTS

| | | | |
|---|---|---|---|
| 3,135,912 | 6/1964 | Baker et al. | 324/303 |
| 3,289,072 | 11/1966 | Schuster | 324/303 |
| 3,402,344 | 9/1968 | Brown et al. | 324/303 |
| 3,617,867 | 11/1971 | Herzog | 324/303 |
| 3,667,035 | 5/1972 | Sliohter | 324/303 |
| 4,528,508 | 7/1985 | Vail, III | 324/303 |

*Primary Examiner*—Michael J. Tokar
*Attorney, Agent, or Firm*—S. R. LaPaglia; E. J. Keeling; H. D. Messner

[57] ABSTRACT

The present invention decreases the time needed between collection cycles of a NML tool located in a wellbore penetrating an earth formation by zeroing the effect of prior-in-time residual polarization via a surprising change in the operating parameters, viz., generating the next-in-time polarizing field with a slow-rising turn-on segment for scattering precessing components of residual polarization thereabout. Result: cyclic NML logging speed can be greatly improved.

24 Claims, 14 Drawing Figures

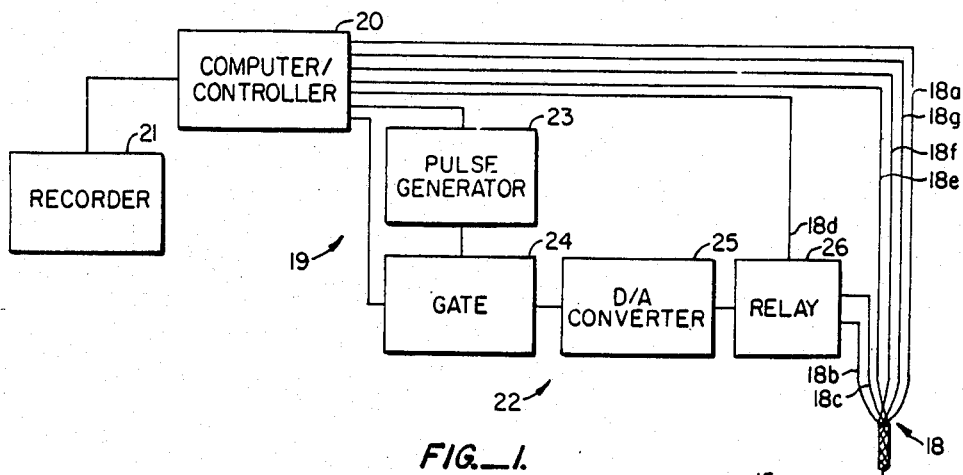
FIG._1.
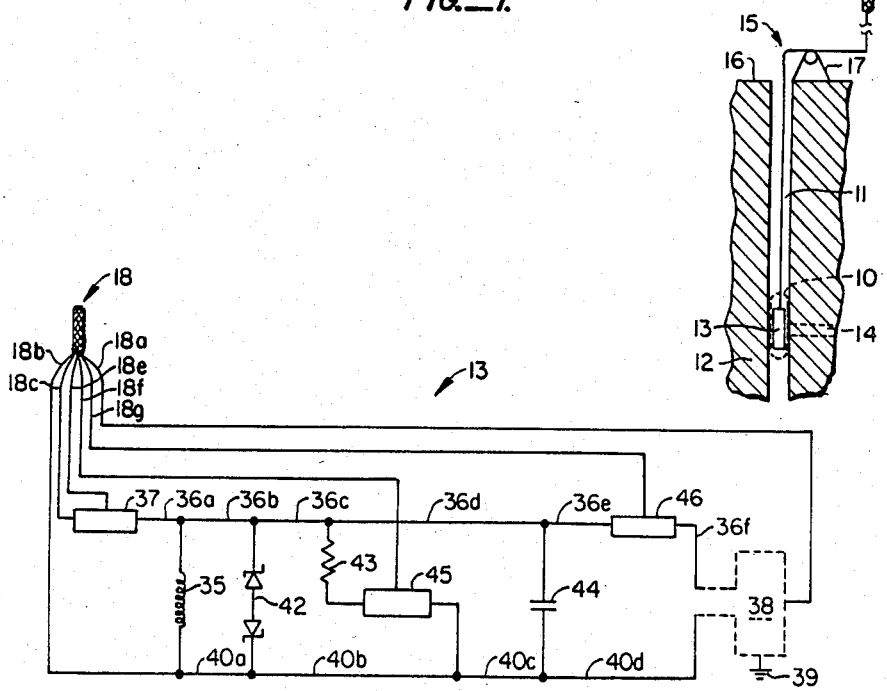
FIG._2.
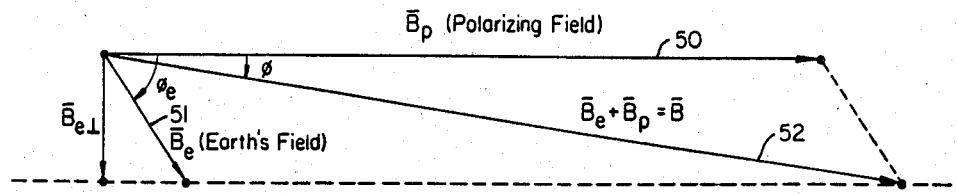
FIG._3.

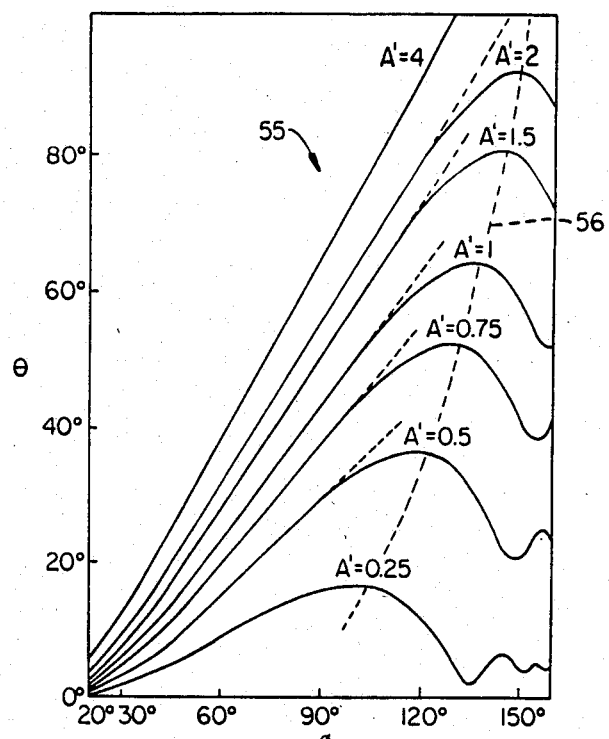
FIG._4.
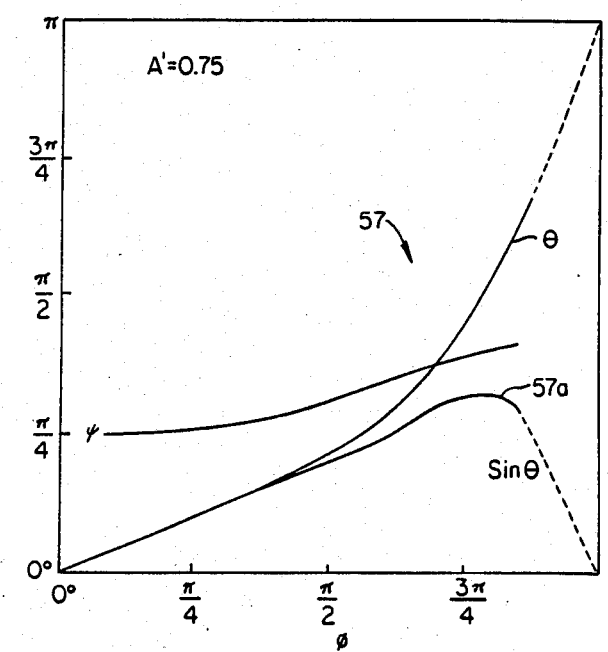
FIG._5.

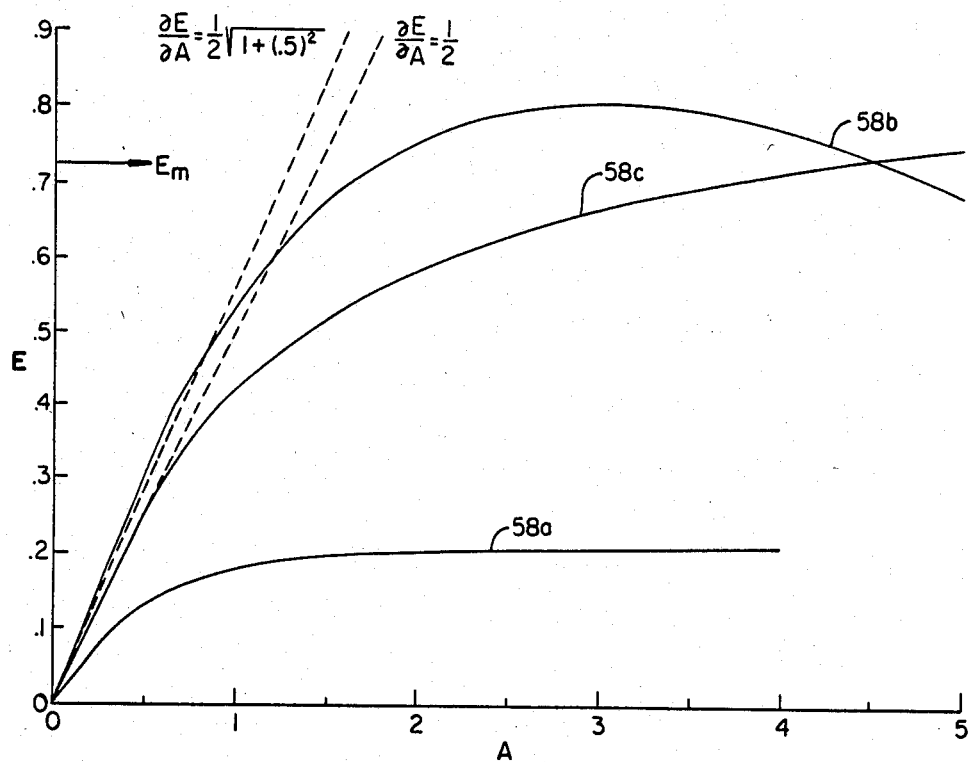
FIG._6.
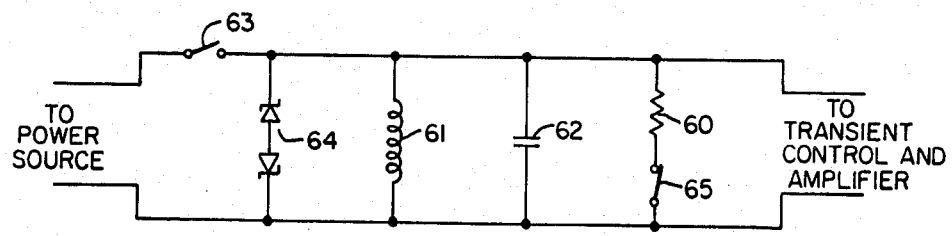
FIG._7.
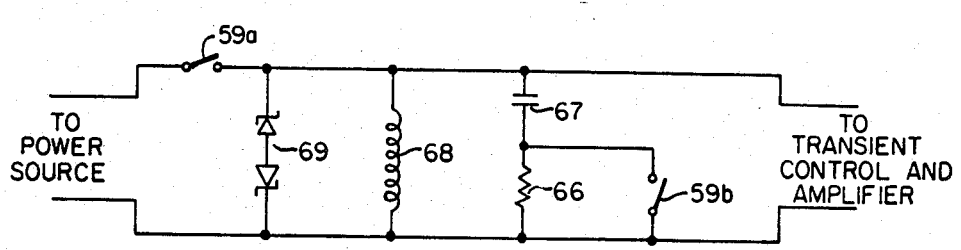
FIG._8.

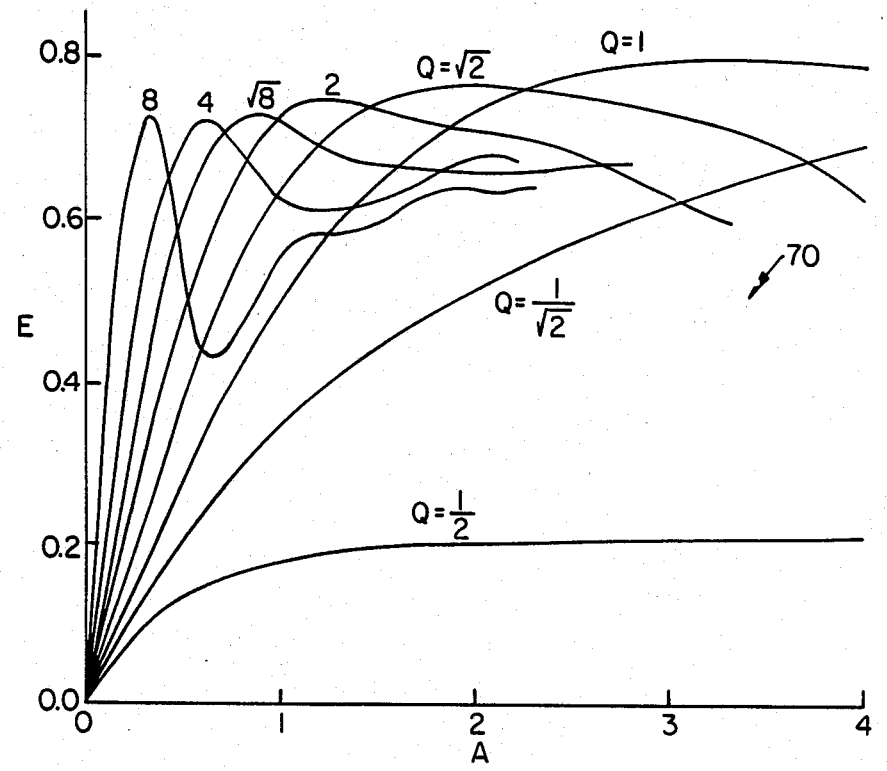
FIG._9.

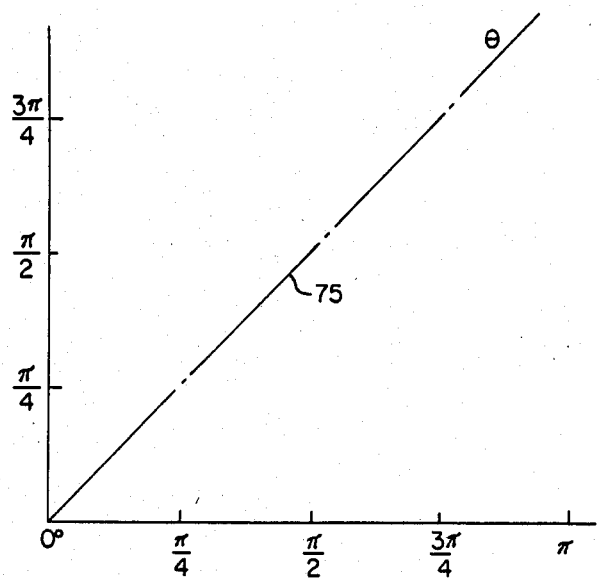
FIG.__10.
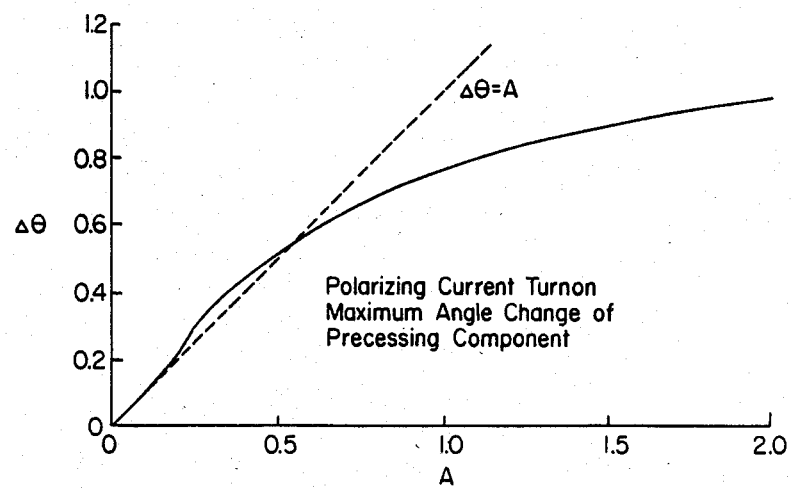
FIG.__11.
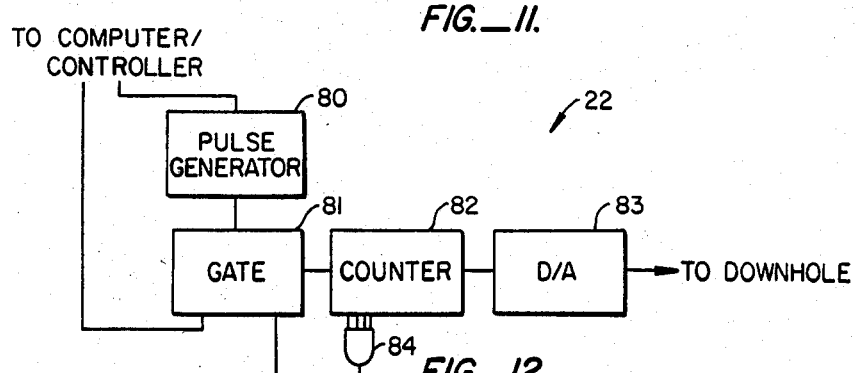
FIG.__12.

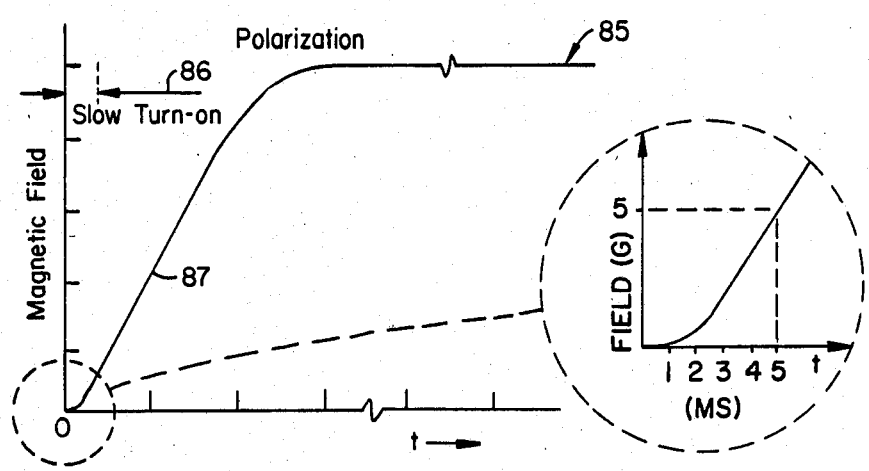
FIG._13.
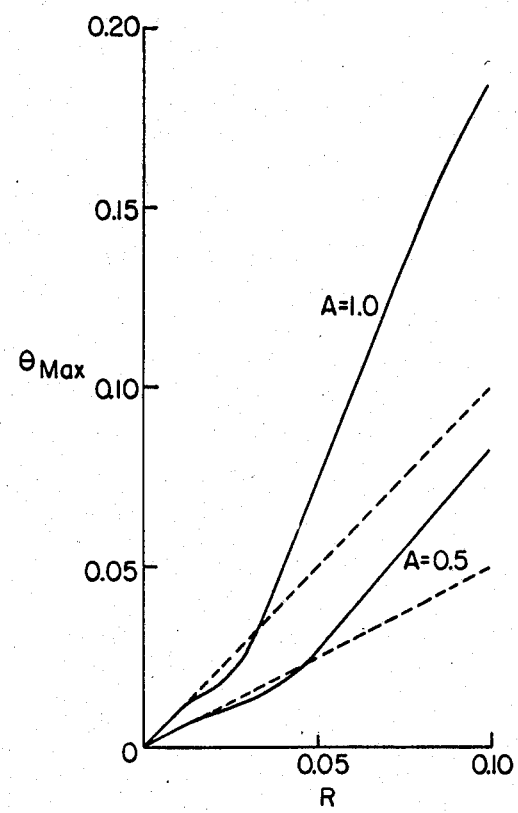
FIG._14.

COMPUTER-LINKED NUCLEAR MAGNETIC LOGGING TOOL AND METHOD HAVING SLOWLY RISING POLARIZING FIELD TURN-ON SEGMENTS FOR RAPIDLY DISPERSING PRECESSING COMPONENTS OF RESIDUAL POLARIZATION ASSOCIATED WITH A PRIOR-IN-TIME NML COLLECTION CYCLE

SCOPE OF THE INVENTION

This invention relates to nuclear magnetic logging methods (hereinafter called NML methods) in which NML proton precessional signals are repetitively collected over a series of detection periods from entrained fluids of an earth formation by means of a NML tool within a wellbore penetrating the formation (viz., detected from hydrogen nuclei over a series of repetitions normalized to a given depth interval).

More particularly, the invention concerns a method of reducing the effect of prior-in-time residual polarization of a set of NML cyclic operations associated with a common depth interval in which at least one of the polarizing periods, of the set, is not long enough to allow such residual polarization to decay by relaxation before the next-in-time collection cycle is to repetitively occur.

In accordance with one aspect, the present invention eliminates any need for a depolarizing period between collection cycles by zeroing the effect of such residual polarization to a substantial degree using a slowly rising turn-on segment of the next-in-time polarizing field after cutoff of the prior-in-time polarizing field, ring down of the coil circuit and detection of the precessing protons of the fluids entrained in the adjacent formation. Result: cyclic NML logging speed can be greatly improved.

In accordance with another aspect, the invention is especially useful in NML logging situations in which the next-in-time polarizing period, is not sufficient to bring about decay of the prior-in-time residual polarization by relaxation without insertion of a long depolarizing period between collection cycles. Usual placement of the depolarizing periods: between at least two of the series of normalized collection cycles of descending order and/or of substantial duration. For example, when a collection cycle with a short polarizing period follows a cycle with a long period, a portion of the polarization of the prior-in-time cycle may inadvertently be manipulated by magnetic fields in such a way that the polarization buildup in the next-in-time cycle does not start at zero.

BACKGROUND OF THE INVENTION

Drillers and producers dislike the use of well-scanning tools that disrupt drilling and/or producing operations. They know that with the drill or producing string pulled from a wellbore and a scanning tool in place, many problems can arise.

For example, differential pressure at the contacting surfaces of the tool with the sidewall of the wellbore can generate a positive force as a function of time. As in-hole tool time increases, so does the likelihood of the tool becoming struck. Also, the drilling mud gets stiffer the longer the tool is within the wellbore, and accumulations on the top of the tool also build up. Such effects are complicating factors for clean removal of the tool even if the latter is continuously moving within the confines of the wellbore during data collection. So, the less time a tool is within the wellbore, the better the chances of its successful removal from the wellbore—on time.

In present NML tools, resident in-hole time has been dictated by requirements of the method itself as well as by system circuits for carrying out the method. For example, the NML data must be collected such that the effect of the polarization of the prior-in-time collecting cycle is essentially zero. Hence, either (i) sufficient time must be allowed between collection cycles, or (ii) the next-in-time polarizing period must be sufficiently long to establish maximum polarization of the entrained fluids before the NML data is collected.

Heretofore, commercial NML operations have provided sufficient conditions whereby conditions (i) and (ii) have been met. In the simplest NML mode of operation in which NML data is collected to establish the "free fluid index" of the formation fluids, the polarizing field is applied to the formation a sufficient time period that maximum polarization of the nuclei is established. That time period automatically guarantees that polarization of previous cycles will be at equilibrium before the proton precession signals are detected.

For cyclic NML operations, different steps are needed. A series of different polarizing time and collection time periods are used in association with a common given depth interval of formation (occurring in either $T_1$-continuous or $T_1$-stationary operations). Problems can occur when a cycle with a short polarizing period follows a cycle with a long polarizing period. As a result, polarization built up during the long polarizing period may spill over into the short period and may be manipulated by magnetic fields of the latter in such a way that the polarization buildup of the latter period does not start at zero. Hence, under these circumstances, heretofore a depolarizing time interval was inserted in the cycle of NML operations to allow the residual polarization to decay to equilibrium by relaxation. Such depolarizing time interval is of the order of two seconds. But since the polarizing periods of cyclic NML operations is each only a few tenths of a second and the signal observation intervals each is likewise only a tenth of a second or so, the need for such a long depolarizing period has imposed severe limitations on NML logging speed, say to about 300 feet/hour. It has only been tolerated because of the large time requirements of the uphole computer linked to the NML tool, viz., the time needed by that equipment to reduce the NML data to an acceptable display form. I.e., such reduction (being of the order of two seconds to reduce the observed data to an acceptable display form) has allowed time for the prior residual polarization to decay to equilibrium before the shorter polarization cycle was implemented.

However, now improvements in hardware and software within the associated uphole system at the earth's surface have been proposed by oil field service companies. Goal: to reduce the time frame needed for the computer to reduce the NML data to acceptable form between collection cycles. Such advances encompass hardware, software and/or firmware improvements from individual as well as various combinational forms. However, I have found that the total time required for performing a set of collection cycles of different polarizing periods (even though combined in a collection process that uses the above-mentioned proposed improvements), remains about the same as previously practiced. Reason: in cyclic NML logging, a 2-second depolarizing period must be used between selected collection cycles to insure that the polarization buildup always begins at zero. The speed of the logging sonde under these circumstances: about 300 feet/hour.

These limitations also apply regardless of how long the polarizing times are, or how the ratios of the polarizing periods relate one to the other. For example, in reference to the former in practicing $T_1$ continuous logging even if the polarizing periods of a normalized set, were changed to 3200, 800, and 1600 milliseconds, the total time per sequence would still take 6 seconds, even if the polarizing periods were changed to 3200, 800, and 1600 milliseconds, the total time per sequence would still take 6 seconds even though there is no need to insert depolarization periods between cycles. Or in reference to the latter instead of polarizing times of the set defining ratios of 4:1:2, different ratios, say 20:1:4 (viz., a series of polarizing times of 2000, 100, and 400 milliseconds with each followed a short signal-observing period) requires about 5 seconds per sequence, since a 2-second time for depolarization must be used after the 2000-millisecond polarizing period. Result: little improvement in logging speed.

Hence, there is now a need to artificially dispose of the effects of prior-in-time polarization within a period substantially shorter than the typical 2-second maximum mentioned above under normal NML cyclic operations and preferably within a period shorter than the present signal-observation time (viz., shorter than above one-tenth of a second). In that way, there would be provided a significant improvement in NML logging speed, e.g., say from 300 to about 600 feet/hour.

Hence, an object of this invention is to provide a method of reducing the effect of residual polarization in cyclic NML operations normalized to a common depth interval whereby such polarization can be reduced to approximately zero within a time period less than the present signal observation time, viz., less than approximately 100 milliseconds. Result: the repetition rate for a series of NML collection cycles normalized to the same depth interval is much improved and logging operations can be carried out at a surprisingly rapid rate.

SUMMARY OF THE INVENTION

In accordance with the present invention, I have discovered that the signal contributions from residual polarization can be manipulated—to reduce the required depolarization period to the above desired range centered at about 0.1 second—without extensive modification of existing circuitry of the NML tool. Heretofore, the NML polarizing and detection circuitry of the tool was tuned to approximately the resonant frequency of the expected NML precession signals as well as tuned to maximize enhancements brought about as the coil circuit rings at a selected Q value or quality factor after cutoff. In this aspect, the term "tuning" is used both to describe the altering of the values of circuit elements of the coil circuitry to achieve resonance at a desired frequency in the frequency sense as well as to describe similar changes to achieve enhancement of the polarization as the ringing field undergoes damped oscillation as a function of time in the Q-sense.

The present invention has special application in NML operations in which after cutoff of the polarizing field the coil circuit is permitted to ring at a selected frequency. That is to say, as the polarizing current is cutoff, the collapse of the polarization field causes an oscillating voltage to be generated in the coil. A large part of this voltage and the resulting current (representing a quantity of energy stored in the polarizing circuitry) is dissipated within the coil circuit. A small part, however, (called "ringing") is permitted to decrease with time and to produce an oscillating resonant magnetic field that propagates outward into the formation and reorients the polarization previously produced. The rate of decay of the ringing is a function of the Q of the circuitry. For any combination of system parameters, including coil configuration, borehole diameter and position of the coil in the borehole, thus a Q of the circuitry exists that produces a maximum NML response after the polarizing field collapses and ringing occurs.

In other words, for a given set of system parameters, there is a Q in which reorientation of the produced polarization is effected—with enhancing advantage—by the magnetic field generated during ringing.

While heretofore the relationship of the collapse of the polarizing field upon the polarizing coil, resulting ringing of the polarizing circuitry and the tuning of the Q of that circuitry for enhancement purposes has been established, I have now discovered that after the Q of the polarizing circuitry has been established, prior-in-time precessing components of residual polarization precessing in the earth's field can be effectively disposed via their reorientation by a sufficiently slow rising next-in-time polarizing field and then permitting—after reorientation—the precessing components to be scattered by precession about the field. By the term "slow", it is meant that the instantaneous angular frequency of rotation of the slowing rising next-in-time polarizing field ($\Omega$) is much smaller in magnitude than the instantaneous precession frequency ($\omega$) of the precessing components of the residual polarization about that field, i.e., . . . , $$\Omega << \omega$$

Preferred range of the ratio of $\omega$ to $\Omega$: 10 to 100.

By the term "rise time", it is meant the time required for the leading edge of the next-in-time polarizing field to rise from 0 to several times the strength of the earth's field. Result: ultra long depolarizing periods previously required for cyclic NML operations in order to allow precessing residual polarization in the earth's field to decay to equilibrium are sharply reduced, say to a desired depolarizing range centered about 0.1 second, and with attendant improvement in cyclic NML logging speed, say from 300 feet/hour to 600 feet/hour.

The mechanism of disposal of the precessing components of residual polarization: reorientation of the precessing components using the field associated with the turn-on rising segment of the next-in-time polarizing field to change the direction of the latter until it parallels the direction of the final maximum value followed by disposal of the precessing components by scattering via precession about the final field.

After the slow turn-on polarization has occurred and ringing has decayed, the Q of the system as seen by the detection circuitry is normally increased for the reception of the NML signal. Such increases still occur in accordance with the present invention. Also, the commercial NML operates with a single coil system for both the polarizing and signal reception operations, but the extension of these descriptions of the invention to a system with separate coil systems for the two functions is quite clear.

DESCRIPTION OF THE DRAWINGS

FIG. 1 is a partial schematic of an improved NML system in a well-surveying environment wherein an uphole computer-linked control and signal-generating and recording circuitry is depicted in system contact with nuclear magnetic polarizing and signal detection circuitry positioned within a borehole penetrating an earth formation;

FIG. 2 is a diagram illustrating the polarizing and signal detection circuitry of FIG. 1 in which a damping resistor is disconnectably connected in parallel with a tuning capacitor and with a single polarizing and detection coil;

FIG. 3 is a vector plot of the earth's field ($\overline{B}_e$), the polarizing field ($\overline{B}_p$) and the resultant field ($\overline{B} = \overline{B}_e + \overline{B}_p$) at the start of cutoff of the polarizing current and ringing of the coil of FIG. 2, illustrating the theoretical basis of the present invention;

FIG. 4 is a plot of the angle $\phi_e$ between the earth's field ($\overline{B}_e$) and the polarizing field ($\overline{B}_p$) of FIG. 3 and the angle $\theta$ between the polarization $\overline{M}$ and the resultant field ($\overline{B}$) as a function of different dimensionless parameter values A;

FIG. 5 is a plot of the angle $\phi_e$ as a function of angle wherein phase angle ($\psi$), angle $\theta$ between the polarization $\overline{M}$ and the resultant field ($\overline{B}$) and sin $\theta$ are plotted to show their interdependence;

FIG. 6 is a plot of cutoff efficiency as a function of dimensionless parameter A for a series of different coil circuits again useful in explaining the theoretical basis of the present invention;

FIG. 7 is a schematic circuit diagram that focuses in more detail on the operation of the coil circuit of FIG. 2;

FIG. 8 is a circuit diagram akin to FIG. 7 illustrating an alternative to the circuitry of FIG. 2;

FIG. 9 is another plot of cutoff efficiency as a function of dimensionless parameter A for a coil circuit having different Q values;

FIG. 10 is a plot of angle $\theta$ between the polarization $\overline{M}$ and earth's field $\overline{B}_e$ and of angle $\phi$ between the polarizing field $\overline{B}_p$ and the resultant field $\overline{B}$ as a function of dimensionless parameter A;

FIG. 11 is a plot of $\Delta\theta$ and residual polarization as a function of the dimensionless parameter A;

FIG. 12 is a detail of the uphole signal-forming and driving network of FIG. 1 illustrating circuit elements for generating the polarizing field of the present invention;

FIG. 13 is an amplitude vs. time plot of the polarizing field generated by the signal-forming and driving network of FIG. 12; and FIG. 14 is a plot of angle $\theta$ as a function of R for various values of dimensionless parameter A.

DESCRIPTION OF THE INVENTION

As shown in FIG. 1, a logging sonde 10, shown in phantom line, is positioned within a borehole 11 penetrating an earth formation 12. Within the sonde 10 is polarizing and detection coil circuitry 13. Purpose of circuitry 13: to polarize the adjacent formation 12 and then detect NML precessional signals from hydrogen nuclei of entrained fluids on a cyclic basis normalized a series of depth interval along the borehole 11. A typical depth interval is shown at 14 wherein a series of polarizing periods, followed by shorter detection periods, provide a sequence of NML data associated with a conventional series of collection cycles. Typically, in a $T_1$ collection sequence a set of numbered, different collection cycles (say, 100, 200, 400, 800, 1600, and 3200 milliseconds periods) are internally repeated a number of times (usually about ten times) all normalized to the same depth interval 14 wherein similar resulting data can be stacked. But higher precision of the internally stacked data requires more complete disposal of the residual polarization to prevent an incremental gradual buildup of the latter, even though the internal polarizing times are equal. Hence, one or more polarizing periods had to be allowed for within each collection cycle. Thereafter, the resulting NML data is sent uphole via logging cable generally indicated at 15 that includes a strength-aiding elements (not shown) rigidly attached to the sonde 10 (at the uphole end thereof) and rotatably supported at the earth's surface 16 by a support winch 17 that includes a depth sensor (not shown). Cable 15 also includes a series of electrical conductors generally indicated at 18 for aiding in the control and operation of the downhole polarizing and detection circuit 13. For example the series of electrical conductors 18 can include a NML signal transmitting conductor 18a by which the NML data collected downhole can be transmitted uphole for enhancement and recording within a computer-controlled recording system also at the earth's surface 16 and generally indicated at 19. Such computer-controlled recording system 19 includes a computer within computer-controller 20 whereby the resulting NML data can be organized and enhanced to provide meaningful estimates of permeability and porosity of the given depth interval. Results are recorded at recorder 21 as a function of depth interval along the borehole 11 as determined by the depth indicator at winch 17. Also linked to computer-controller 20 is a signal-forming and driving network 22. As explained in more detail below, the network 22 provides a tailored polarizing current each collection cycle that is transmitted downhole to the polarizing and detection circuit 13 within sonde 10, say via a pair of current conductors 18b and 18c shown attached to relay 26 at the output of D/A convertor 25 of signal-forming and driving network 22. Also located at the earth's surface 16 are a series of additional electrical conductors 18d, 18e, 18f, and 18g. These additional conductors connect to computer-controller 20 of the computer-controlled recording system 19 for the purpose of controllably linking various elements, miscellaneous equipment and operations of the present invention at both the earth's surface 16 and downhole within polarizing and detection circuit 13 as explained in more detail below. For example, conductor 18d aids in the control of uphole relay 26 during operations so that after polarization, the signal-forming and driving network 22 is disconnected from the downhole polarizing and detection circuitry 13 for more reliable detection of the precessional NML signal during each collection cycle.

Computer-controller 20 can include improvements in hardware and software within the associated computing system as proposed by oil field service companies. Goal: to reduce the time needed to reduce the NML data to an acceptable display form between collection cycles.

However, even using such advances, the total time required for performing, say $T_1$ stationary measurements, has remained the same as before practiced due to residual polarization buildup. The speed of the logging sonde 10 under these circumstances: about 300 feet/-hour.

FIG. 2 illustrates the polarizing and detection coil circuitry 13 in more detail.

As shown, a polarizing coil 35 is connected uphole to signal-forming network 22 on one side by conductor segment 36a, switch 37, and uphole conductor 18c, and on the other side by conductor 18b so as to be driven with a polarizing current of predetermined duration. In series with conductor segment 36a are conductor segments 36c, 36d ... 36f. These latter conductor segments 36b ... 36f connect the coil 35 to the active section of signal detection circuit 38 during the detection of the precessional NML signals. The coil 35 is also connected to ground at 39 within detection circuit 38 by means of additional conductor segments 40a, 40b ... 40d. Between the conductor segments 36b ... 36f and ground 39 are several circuit elements paralleling the coil 35. Paralleling the coil 35 are Zener diodes 42, a resistance element 43 and a capacitor 44. Switch 45 connects resistance element 43 to ground 39 while switch 46 disconnectably connects conductor segments 36e and 36f. Switches 45 and 46 are controlled by command signals originating uphole and passing thereto via conductors 18f and 18g, respectively, during polarization, cutoff of the polarizing current and ringing of the coil 35 as well as during detection of the precessional NML signals. In addition, during cutoff and ringing, the resistance element 43 and the coil 35 are used to establish damping of the collapsing field as explained in more detail below.

During polarization, uphole relay 26 of FIG. 1 and switches 37, 45, and 46 of FIG. 2 are controlled so that the coil 35 is driven by polarizing current from the uphole circuitry is at a maximum level; at the same time, the detection circuitry 38 of the polarizing and detection coil circuitry 13 is protected. Referring to the FIGS. in more detail, the contacts of relay 26 and switch 37 are initially controlled so as to be closed during polarization. In that way, the uphole signal-forming and driving network 22 is contacted directly to the coil 35. At the same time, the contacts of switch 45 and of switch 46 remain open during this period of operations, i.e., remain open with respect to uphole conductors 18b and 18c. As a result, the coil 35 is driven with a maximum polarizing current to generate a strong polarization field oriented at an angle to the earth's field over a predetermined time duration without harming the detection circuit 38. Thereafter, the contacts of the uphole relay 26 and switch 37 are opened as switch 45 is closed and the polarization field of the coil 35 is permitted to collapse. During collapse of the field, a discharge path is initially established through the Zener diodes 42 to ground 39 for the self-induced current within the coil 35 wherein the self-induced voltage across the diodes 42 remains essentially constant for any value of induced current above a selected value for a selected time frame. Of course, the most rapid field decay would be obtained with the coil 35 unloaded, i.e., with a substantially infinite resistance path being placed in parallel with the coil 35. Unfortunately, the magnitude of the voltages induced would destroy not only the coil 35, but also the associated electronics. On the other hand, a low resistance across the coil 35 that would maintain the transient voltage within reasonable limits would make current cutoff too slow for detection of precessional signals.

But in accordance with the present invention because an initial discharge path for self-induced current, as provided by the Zener diodes 42, is followed by generating an enhancing oscillating field by driving the coil with a current inversely proportional to resistor 43 connected in a parallel circuit with the coil 35 but dissipating. Result: enhanced ringing of the coil at the proton precession frequency within a time frame that still allows for timely detection of the precessional signals from fluids within the formation at modest cutoff rates. In this regard, the resistance value of resistor 43 is selected at a value that associates the Q value of the coil circuit as explained in more detail below wherein ringing of the coil (at a higher Q value) is carried out at the frequency of proton precession of the adjacent fluids.

It should be noted in this regard that during damping of the stored energy, that although higher resistance value of the Zener diodes 42 results during fast cutoff, this effect is overshadowed by the value of the resistance element 43 in parallel with tuning capacitor 44 in establishing the higher Q of the coil 35. Such a Q value permits the coil circuit to quickly approach a condition that allows magnetic oscillations or "ringing" to occur as the stored energy is damped for enhancement of the previously generated nuclear polarization, as explained in more detail below.

After ringing has subsided, switch 46 is closed as switch 45 is opened. This operation connects the coil 35 to the initial stage of the signal and detection circuit 38. During this time frame, the capacitor 44 (with the resistor 43 decoupled) continues to tune the coil 35 to the proton precession frequency of the NML signals to be detected. With the resistor 43 decoupled from the circuit, the Q value of the circuitry is lowered. This occurs even though the Zener diodes 42 are still in the circuit but the latter have no effect, since they appear as an almost infinite resistance to the low voltages of the circuitry. Note, also, that the Q of the coil circuitry can even be changed, if desired, by appropriate operation of the feedback networks associated with the amplifying network of the circuit 38. The theory and description of such networks are discussed in detail in my U.S. Pat. No. 3,204,178 for "AMPLIFIER INPUT CONTROL CIRCUITS", issued Aug. 31, 1965. Such networks provide for reasonably low resistance paths for discharge of the self-induced voltages while the Q of the circuitry is changed to a value compatible with effective reception of the precessional signals.

While general equations of state for polarization during cutoff are available at least for the case of a polarizing field that starts large compared to the earth's field and is then bought linearly to zero (viz., instantaneous cutoff), none have been developed for the case in which a "ringing" oscillating field is used to enhance the previously generated nuclear polarization at the proton precession frequency of fluids to be detected in an adjacent earth formation. Briefly, I have found that allowing the coil 35 to ring at the frequency of proton precession with an appropriate higher Q following cutoff provides for signal detection sensitivity that is only slightly less than that obtained with instantaneous cutoff, but also minimizes the effects of prior-in-time components of residual polarization that were parallel to the earth's field at the start of the polarization period. The basis for this conclusion is set forth below in which a series of key NML terms are developed in conjunction with the definitions set forth below in the Section entitled "SYMBOLS AND DEFINITIONS SECTION", viz.:

Nuclear Magnetization, Dipole Moments Polarization and Relaxation

Hydrogen nuclei of entrained fluids of the earth formation have magnetic dipole moments which produce magnetic fields somewhat like those of tiny magnets. Were it not for the fact that the moments can come within the influence of the polarizing field of coil 35, their fields would be randomly oriented and not produce an observable external magnetic field. But since they are subjected to such field, their associated magnetic fields can become aligned with that field. At the same time, a scrambling effect due to thermal motion is produced. It tends to prevent such alignment. But a slightly preferential alignment (called polarization) occurs. Note that the polarization is proportional to the strength of the polarizing field that causes the alignment but inversely proportional to absolute temperature, the latter being a measure of thermal motion tending to scramble the system of nuclear magnetic moments.

The nuclear polarization produces a magnetic field which can be detected. Note that the polarization does not decay immediately when the field is removed. The process of the approach of the polarization to its new equilibrium value when the magnetic field is changed is called "relaxation" and the corresponding times are called "relaxation times". (Note in this application the term "nuclear magnetization" corresponds exactly to polarization but it is acknowledged that the latter is sometimes referenced as a dimensionless term only.)

Precession

In addition to being little magnets, fluid nuclei are also like little gyroscopes, and can be twisted just as gravity twists a spinning top. Result: The nuclei precess. That is, they precess unless they are aligned with a strong field just as the toy top precesses so long as it is not aligned with the earth's field of gravity.

Detection of Precession

A precessing nuclear polarization produces a rotating magnetic field which in turn generates electric signals which can be detected. Precessional frequencies are directly proportional to the strength of the twist causing the precession, that is to say, it is directly proportional to the strength of applied field, and the precessional frequency is 4.2577 kilohertz per gauss of applied DC field for hydrogen nuclei of interest.

Conditions for Precession

Two things must be present to obtain a precessing polarization. First, the polarization must be produced by subjecting the fluids to a polarizing field for an appropriate length of time. Second, the polarization and another field must somehow be made not parallel to each other as by reorienting the fields so that the polarization is subjected to a magnetic field in a new direction.

In nuclear magnetism logging, proton precession is caused to take place in the earth's field after the nuclear polarization has been generated in a direction in the borehole at an angle, say preferably 90° to the earth's field when the polarizing field is cut off, the polarization is left to precess about the earth's field.

CUTOFF EFFICIENCY

Consider the case of an idealized two-dimensional dipole, single-coil logging system centered in a borehole. The units used here are intended to be consistent and, for convenience, several quantities will be used in dimensionless form, and certain other conventions will be adopted, as set forth under the "SYMBOL AND DEFINITIONS SECTION" infra. With instantaneous polarizing field cutoff, the signal from a small element of area is proportional to the local value of $\sin^2\phi_e$, the angle between the earth's field ($\overline{B}_e$) and the polarizing field ($\overline{B}_p$) and inversely proportional to the fourth power of l, the distance from the borehole axis. As shown in FIG. 3, $\overline{B}_p$ is the polarizing field, indicated by vector 50, and $\overline{B}_e$ is the earth's field, indicated by 51. A bar or caret over the symbol for a field indicates a vector (with the caret indicating a unit vector), absence of a bar or caret indicates the scalar amplitude, and a dot over a symbol indicates rate of change. Thus, $-\dot{B}_p$ is the rate of reduction of the polarizing field. The rate of increase of $\phi$, the angle between the polarizing field $\overline{B}_p$, and resultant of $\overline{B}_p$ and the earth's field, $\overline{B}_e$ indicated by vector 52, is governed by the ratio $\dot{B}_p/B_e$. If $B_p$ is constant during cutoff prior to ringing, if any, the cutoff can be characterized by the dimensionless parameter $$A' = (-\dot{B}_p/B_{e\perp})/\omega_{e\perp} = \dot{B}_p/(\gamma B_{e\perp}^2), \quad (1)$$

where $\omega_{e\perp}$ is the instantaneous precession angular frequency when $\phi = 90°$, and $\gamma$ is the magnetogyric ratio. The ratio $-\dot{B}_p/(\gamma B_e^2) = G'$, with $G' = A' \sin^2\phi$, is fixed if the only parameter varied is $\phi$. Much of our discussion will be specialized to the case $\phi = 90°$, for which $A' = G'$, i.e., the NML tool is entered in the borehole with axis, of the latter parallel to the earth's field.

In NML, $B_e$ is usually of the order of a half gauss, and $B_p$ at the edge of the borehole, usually over a hundred gauss. The time to turn off $B_p$ is of the order of 10 milliseconds. Thus, G at the edge of the borehole may be of the order of two, and it decreases rapidly with distance into the formation.

The instantaneous rate of cutoff will be characterized by the parameter $$\alpha = \Omega/\omega = A' \sin^3\phi = G' \sin^3\phi/\sin^2\phi_e, \quad (2)$$

where $\Omega = d\phi/dt$, and $\omega$ is the instantaneous angular frequency of precession about the resultant of the earth's field and the polarizing field. If $\alpha \gg 1$, cutoff is fast, and the polarization is nearly left behind as the direction of the resultant field changes. If $\alpha \ll 1$, the polarization nearly follows. Reference to FIG. 3 shows that for most of the cutoff time, the angle $\phi$ is very small. For instance, if $A' = 2$, and $\phi = 20°$, Equation 2 gives $\alpha = 0.08$. Even for a much higher cutoff rate, the first ten or more degrees of angle change is slow. The rest of the cycle is in the intermediate range, with $\alpha$ comparable to one, unless $\phi_e$ is nearly 180°, in which case the precessing polarization is not coupled to the NML coil to give a signal.

To specify the position of polarization during cutoff, $\theta$ is defined as the angle between the polarization $\overline{M}$ and the resultant field $\overline{B} = \overline{B}_p + \overline{B}_e$, and the phase $\Psi$ is specified as the angle about $\overline{B}$ with respect to the plane of $\overline{B}_p$ and $\overline{B}_e$, viz., in the plane of FIG. 3.

With non-instantaneous cutoff, the signal contribution from an element of area is proportional to $\sin \phi_e \sin \theta \rho^{-4} e^{i\Psi}$, where $\theta$ is the angle between the polarization and the earth's field after cutoff. The coupling to the coil remains proportional to $\sin \phi_e$, and this factor is not affected by cutoff rate. Since a factor of $\sin \theta$ replaces a factor of sin $\phi_c$, when cutoff is not instantaneous, the factor of sin $\theta$/sin $\phi_c$ is regarded as relevant to cutoff efficiency. Note that this factor can exceed 1.0. The observed signal is the sum of contributions from all elements of area from the borehole wall to infinity, added with proper regard to the phase, $\Psi$. The cutoff efficiency is then the absolute value of the signal with the actual mode of polarizing field cutoff divided by the signal with instantaneous cutoff:

$$E = \frac{\int_{\eta=0}^{2\pi} \sin^2\phi_c(\eta) \int_{\rho=a}^{\infty} \rho^{-4}(\sin\theta/\sin\phi_c)e^{i\psi} \rho \, d\rho \, d\eta}{\int_{\eta=0}^{2\pi} \sin^2\phi_c \int_{\rho=a}^{\infty} \rho^{-4} \rho \, d\rho \, d\eta} \quad (3)$$

where $\eta$ is azimuthal angle around the borehole axis. (Note that the customary symbol, $\phi$, has already been used for something else.) Note also that $\theta$ and $\Psi$ depend on $\phi_e$ and $\rho$. For the geometry under consideration, $\phi_e$ does not depend on $\rho$ or A, but may depend on $\eta$. The integrations in the denominator are separable.

The local cutoff rate A is a function of the strength of the polarizing field, which is inversely proportional to the square of $\rho$:

$$A(\rho) = A(a)(a/\rho)^2 \quad (4)$$

$$dA(\rho) = -2a^2 A(a)\rho^{-3} \, d\rho$$

$$\rho^{-4}\rho \, d\rho = -\text{Constant} \times dA(\rho) \quad (5)$$

In the following, the symbol A' is used to indicate $A(\rho)$ at a general distance into the formation and the symbol A or A(o) is used to indicate A(a), the value of A at the borehole wall.

Substituting (5) into (3)

$$E = \frac{\int_{\eta=0}^{2\pi} \sin^2\phi_c(\eta) \int_{A'=0}^{A} (\sin\theta/\sin\phi_c)e^{i\psi} \rho \, dA \, d\eta}{\int_{\eta=0}^{2\pi} \sin^2\phi_c \int_{A'=0}^{A} dA} \quad (6)$$

Let the ratio of the A-integrals be E*($\eta$), so that E*($\eta$) is given by $$E^*(\eta) = \langle \sin \phi^{i\Psi} \rangle / \sin \phi_e \quad (7)$$

where the brackets $\langle \rangle$ indicate an average with respect to A' over the range from zero to A.

Put (7) into (6)

$$E = |\langle \sin^2\phi_e E^* \rangle| / \langle \sin^2\phi_e \rangle \quad (8)$$

where here the $\langle \rangle$ indicate average with respect to $\eta$ over the interval from zero to two $\pi$.

If the earth's field is parallel to the borehole axis, then sin $\phi_e$ and E* are no longer functions of $\eta$. Then the cutoff efficiency is simply $$E = |E^*| = |\langle \sin\theta \, e^{i\Psi} \rangle| \quad (9)$$

Recall that the position of the polarization can be specified by $\theta$ ($\theta$ is the angle between the polarization $\overline{M}$ and the resultant field $\overline{B} = \overline{B}_p + \overline{B}_e$) and $\Psi$ where $\Psi$ is the angle about $\overline{B}$ with respect to the plane of $\overline{B}_p$ and $\overline{B}_e$, viz., in the plane of FIG. 3. If $\alpha$ and its first several $\phi$-derivatives are much less than one, the approximate polarization positions are given by $$\theta = \tan^{-1}\alpha = \tan^{-1}A' \quad (10)$$

$$\psi = \pi/2 - \tan^{-1}(d\alpha/d\phi)$$

As before, the primes indicate a general position in the formation rather than values at the edge of the borehole. From (9), $$E = |\langle \sin(\tan^{-1}A') \, e^{i\pi/2} \rangle| \quad (11)$$

$$= (1/A) \int_0^A \sin(\tan^{-1}A') \, dA'$$

$$= \frac{1}{A} \int_0^A \frac{A'}{\sqrt{1 + A'^2}} \, dA'$$

$$E = (\sqrt{1 + A^2} - 1)/A \quad \text{(small } A\text{)}$$

From (10), the obtained values are used as starting points for numerical integrations to compute $\theta$ and $\Psi$ for the part of the cutoff for which $\alpha$ is not very small and are plotted in FIG. 4.

FIG. 4 is a series of curves 55 showing the buildup of the angle $\theta$ during cutoff as a function of angle $\phi_e$. Curve maxima are connected along dotted line 56. Note that the curves 55 are for constant A'=G'=$\alpha$; i.e., constant $\overline{B}_{e\perp}$. Also note that curve segments to the right of dotted line 56 are not usable for signal because of rapid phase changes.

FIG. 5 is a series of curves 57 to show the interdependence of $\phi$, $\Psi$, and sin $\theta$ as a function of $\phi$ for constant A'=0.75, thus showing the effect of various angles between the earth's field and polarizing field on the former. Precessing polarization is proportional to sin $\theta$, and its coupling to the NML coil is proportional to sin $\phi_e$. In NML, if the borehole axis is parallel to the earth's field, much of the signal comes from regions where $\phi_e$ is close to 90° ($\pi/2$ radians). If the angle between the axis and the earth's field is 30°, most of the signal comes from regions with $\phi_e$ between 60° and 120° ($\pi/3$ and $2\pi/3$ radians). From FIG. 5, it is seen that this range of angles does not drastically reduce the signal below that which would be obtained with $\phi_e$ very close to 90°. I.e., sin $\theta$ curve 57a is roughly linear in the vicinity of 90°, giving an average only a little lower than for 90° after putting in the coupling factor. The phase differences are mild. If the earth's field is perpendicular to the borehole axis, about half the signal is lost.

Similarly, from Equation (9), values of E can be obtained by computer without making the approximation (11). Such values are shown in FIG. 6 as a series of curves 58a, 58b, and 58c. Curve 58a shows E values for a coil circuit like that of FIG. 2, except it has been critically damped during cutoff; curve 58b is for a coil circuit in which the resistor 43 of FIG. 2 has been placed in series with the coil 35; and curve 58c illustrates E values for a coil circuit that has been designed to provide linear cutoff and no overshoot.

Equation (11) may be altered by somewhat compressing A for larger values to give a good fit to the computed values for larger A.

$$E = (\sqrt{1+x^2} - 1)/x; \quad x = A^{(10+A)/(10+2A)} \quad (12)$$

At A=0, $$(dE/dA) = \tfrac{1}{2}; \ (d^2E/dA^2) = 0 \quad (12a)$$

ENHANCEMENT OF θ BY RESONANT PULSES AFTER CUTOFF WITH VERY SMALL A' WITHOUT MINIMIZING RESIDUAL POLARIZATION

For very small A', $\hat{M}$ is nearly parallel to $\hat{B}_e$. If an oscillating field is applied parallel to $\hat{B}_p$, this field can be resolved into components parallel $\hat{B}_e$ and parallel to $\hat{B}_2$ (i.e., perpendicular to $\hat{B}_e$). Note in this regard that $\hat{B}_1$ and $\hat{B}_2$ are defined as follows: $\hat{B}_1 = \hat{B}_e \times \hat{B}_p$ and $\hat{B}_2 = \hat{B}_1 \times \hat{B}_e$. Further, the component parallel can be resolved to $B_2$ into two components rotating in opposite directions in the plane of $\hat{B}_1$ and $\hat{B}_2$, each with amplitude half that of the component parallel to $\hat{B}_2$. Then $$B_{rot}' = \tfrac{1}{2} B_{osc}' \sin \theta_e \quad (13)$$

If $B_{rot}'$ is substantially smaller than the earth's field and if the frequency of the field is the proton precession (Larmor frequency), the component of the field parallel to the earth's field and the rotating component, whose sense is opposite to that of the proton precession, can be ignored.

If the polarization is viewed from a frame of reference rotating about $\hat{B}_e$ with the earth's-field precession frequency, it is seen that a secondary precession at rate $B_{osc}'$ about some axis in the plane of $\hat{B}_1$ and $\hat{B}_2$ (i.e., perpendicular to $\hat{B}_e$). The position of this axis depends on the phase of the oscillating pulse with respect to the time one jumps onto the rotating reference frame. If $B_{osc}'$ is of fixed amplitude and is applied for a time $\Delta t$, the polarization is rotated by an angle $$\mu = B_{rot}' \Delta t \quad (14)$$

If θ is small at the end of cutoff with very small A, we have at the end of the oscillating pulse $\theta \simeq \mu'$.

The concept of a rotating frame of reference has been discussed in my prior patents with respect to NMR response of drilling chips. A difference in the NML application is that the oscillating pulse is not necessarily perpendicular to the precession field and that in the NML the strength of $B_{osc}'$ varies within the sample from zero to some maximum value instead of being substantially constant over the sample.

Since $\mu'$ is proportional to G', the average indicated in (9) may be taken with respect to $\mu'$ instead of A'. Note that in our approximation, Ψ is constant and can be ignored for the purpose of calculating cutoff efficiency. Thus, we have $$E = (1/\mu) \int_0^\mu \sin \mu' \, d\mu' = (1 - \cos \mu)/\mu \quad (15)$$

This function has a maximum of $E_m$ at $\mu = \mu_m$, where $$E_m = 0.7246114 \quad (16)$$

$$\mu_m = 2.331122 \text{ radians} = 133.5635°$$

Note that the value of the current in the coil necessary to produce a rotation μ at the edge of the borehole is a function of the borehole size in the case of a centered coil system. That is, one would need to "tune" the oscillating current to the borehole size.

The computation of this section shows that a cutoff efficiency of $72\tfrac{1}{2}\%$ is attainable even with very slow cutoff. However, there are several disadvantages to slow cutoff because of relaxation, which is ignored in the definition of cutoff efficiency. We will see in later sections that one can use different (usually lesser) values of μ to enhance cutoff efficiency even when G is not small, with cutoff efficiencies somewhat higher than $E_m$.

RING DOWN WITHOUT MINIMIZING RESIDUAL POLARIZATION

The oscillating pulses discussed in the last section are provided by causing the coil 35 to ring. If separate polarizing and receiving coils are employed, either or both coils could be used, either simultaneously or in sequence.

In order to provide the oscillating pulses, it is preferred to cause the coil 35 to ring when tuned to the proton precession frequency. If $B_{rot}'$ is not constant in time, the generalization of (14), $$\mu' = \int_0^t B_{rot}'(t') \, dt' \quad (17)$$

If $B_{rot}' = B'_o \, e^{-t/\tau}$, then $$\mu' = B'_o \int_0^\infty e^{-t/\tau} \, dt = B'_o \tau$$

The ringing method of applying oscillating pulses has the advantages of convenience, of not having to disconnect the tuning condenser, and of a pulse form not ending with a switching disturbance.

RING DOWN WITHOUT MINIMIZING RESIDUAL POLARIZATION VIA SIMPLE PARALLEL CIRCUIT

FIG. 7 shows a simplified basic NML single-resistor 60 in parallel with coil 61 and its turning condenser 62, like that of FIG. 2, in which the polarizing field has been cut off via opening the contacts of switch 63. The value of condenser 62 tunes to the nuclear precession frequency when the damping resistor 60 has been disconnected. Also in the circuit is a voltage limiter 64, which limits the back-voltage during polarizing current cutoff to some definite value. This limiter takes the form of a pair of Zener diodes. The resistance value R of resistor 60, which lowers the Q of the input circuit during cutoff, would presumably be disconnected after cutoff and before signal observation. This is achieved by deactivating switch 65 during such detection period. If wide bandwidth is desired during signal observation, one would presumably accomplish this negative feedback rather than the introduction of an additional source of noise in the circuit.

The polarizing current is assumed to be held constant up to some chosen time, at which the source of current is removed (shown symbolically by opening the contacts of switch 63), and the current through coil 61 flow for a time through voltage limiter 64 and the resistor 60. While current is flowing through voltage limiter 64, the voltage is constant across the coil 61, and the current through the resistor 60 is also constant. The current through the coil 61 decreases linearly (the rate being the ratio of the voltage across the limiter 64 to the coil inductance) until the current through the limiter 64 reaches zero. This instant is defined as time-zero, or t=0. The voltage limiter 64 is assumed effectively out of the picture after this time. The current through the coil 61 before this time is $$I = -\frac{E_c}{L} t \quad (19)$$

$$t \leq 0$$

By noting the definition of G and A in the definitions section, the polarizing field at the edge of the borehole is given by $$B_p \cong -\gamma B_c^2 At \cong -At \quad (20)$$

$$t \leq 0$$

since Q=R/X for the parallel circuit, with X=$\omega_o$L, and $\omega_o$ having unit in the system of units given in the above section. Again, note that to refer to general positions in the formation instead of the edge of the borehole merely need add the "prime" symbols to $B_p$, G, A, etc.

Since $\omega_o$=(LC)$^{-\frac{1}{2}}$ and X=(L/C)$^{\frac{1}{2}}$, the resonant angular frequency for noninfinite Q is $$\omega = 1 - \left[\frac{1}{(2Q)^2}\right]^{\frac{1}{2}} \quad (21)$$

After time-zero, the input circuit will ring with time constant 2Q (i.e., 2Q/$\omega_o$). The transient amplitude and phase are determined by matching the amplitude and slope of Equation (20) at t=0. The solution is, for t≥0, $$B_p = A\left\{\frac{1}{Q} \cos \omega t - \frac{1 - 1/(2Q^2)}{[1 - 1/(2Q)^2]^{\frac{1}{2}}} \sin \omega t\right\} e^{-t/(2Q)} \quad (22)$$

$$\frac{dB_p}{dt} = A\left\{\cos \omega t + \frac{1 - 1/(2Q^2)}{[(2Q)^2 - 1]^{\frac{1}{2}}} \sin \omega t\right\} e^{-t/(2Q)} \quad (23)$$

In the special case of critical damping Q=½ for t≥0

$$B_p = A(2 + t)e^{-t} \quad (24)$$

$$\frac{dB_p}{dt} = -A(1 + t)e^{-t}$$

RING DOWN WITHOUT MINIMIZING RESIDUAL POLARIZATION VIA SIMPLE SERIES CIRCUIT

FIG. 8 shows a simple series circuit in which the Q after cutoff, via opening the contacts of switches 59a and 59b, is determined by the resistor 66 in series with tuning condenser 67. In this case, the current through coil 68 is zero at the time when voltage limiter 69 drops out of the picture. After the transient has decayed and before signal observation, presumably the resistor 66 is shorted by the condenser 67. Here, the phase of the transient is simple.

$$B_p = -At \quad t \leq 0 \quad (25)$$

$$B_p = -(A/\omega) \sin \omega t \, e^{-t/(2Q)} \quad (26)$$

$$\frac{dB_p}{dt} = A\left(\cos \omega t + \frac{1}{[(2Q)^2 - 1]^{\frac{1}{2}}} \sin \omega t\right) e^{-t/(2Q)}$$

$$t \geq 0$$

The angular frequency $\omega$ is still given by (21).
In the case of critical damping (Q=½), $$B_p = Ate^{-t} \quad (27)$$

$$\frac{dB_p}{dt} = -A(1 + t)e^{-t}$$

$$t \geq 0$$

SLOW CUTOFF WITH θ ENHANCEMENT BUT WITHOUT MINIMIZING RESIDUAL POLARIZATION

If Q is of the order of 2.0 or more, the difference between (22) and (26) is mainly a phase shift by an angle of the order of 1/Q, or, in our units, a shift of time-zero by about 1/Q. Thus, for Q≧2, similar results for the parallel and series arrangements, is expected.

For smaller Q, the situation is very different. In the case of critical damping by the parallel resistor 60 of FIG. 7, the current through the coil 61 never reverses, and the cutoff efficiency is much less than with simple linear cutoff alone. Here, for very small A, the conditions for validity of (31) are fulfilled for the entire current decay, that is, to the point where $\alpha$ is zero. Thus, one expects the signal to be of at least second order in A for small A. Furthermore, in the critically damped parallel circuit, the rate of cutoff during the important time when the field is reduced from about the strength of the earth's field to zero is limited by the parallel circuit in such a way that increase of A has almost no effect for A greater than about one.

On the other hand, in the series-damped circuit of FIG. 8, the coil current in affected by neither the condenser 61 nor the resistor 60 until the coil current has been reduced linearly to zero. Then, even for critical damping, there is a current undershoot which enhances the angle θ for small or moderate A.

For small A in the case of the series circuit (or either circuit if Q is of the order of two or greater), the polarization at the end of the linear portion of the cutoff is nearly in the $B_1$ direction, $$\overline{M} \cdot \overline{B}_1 \sqrt{A'} \quad (28)$$

Consider the simple series circuit of FIG. 8 and at t=0 and adopt the rotating frame of reference mentioned previously. Then the effective field is in the $\overline{B}_1$ direction. For (13), (17), and (18), $$B'_{rot} = (\tfrac{1}{2}) A' e^{-t/(2Q)} \quad (29)$$

$$\mu' = A'Q \quad (30)$$

However, the rotating frame picture is not clear for decay times shorter than about a half cycle (Q=$\pi$/2). A possibly more appealing expression for $\pi'$ in the case of small Q is the Fourier component, $$\mu' = (A'/\omega) \int_0^\infty \sin \omega t \sin t \, e^{-t/(2Q)} dt \quad (31)$$

where $$\omega = [1 - 1/(2Q)^2]^{\frac{1}{2}}$$

Integral tables and a page of algebra give the same result as before:

$$\mu' = A'Q \quad (32)$$

The corresponding cosine component is zero. The integration is valid also for Q-values right down to the critically damped value of one-half.

Since this rotation is about the axis $B_1$, from (32)

$$\hat{M} \cdot \hat{B}_2 \simeq \sin(A'Q) \simeq A'Q \quad (33)$$

From (28) and (33), the component of $\hat{M}$ perpendicular to $B_e$, or the precessing component, is $$\sin \theta \simeq A' \sqrt{1 + Q^2} \quad (34)$$

It can be shown that an approximate 90° phase shift in the oscillating field can for small A cause the terms combined in (34) to add linearly instead of quadratically. The result is to favor somewhat the small-G components of signal, namely, the signal from farthest out in the formation.

To compute the cutoff efficiency E from (9), now that $\Psi$ is constant for small A, and that (9) and (34) give $$E = \langle \sin \theta \rangle = \langle A' \rangle \sqrt{1 + Q^2} \quad (35)$$

$$\langle A' \rangle = (\tfrac{1}{2}) A$$

$$E = (\tfrac{1}{2}) A \sqrt{1 + Q^2}$$

The validity of (35) requires that $A << 1$ and also $\mu << \mu_m$, or from (32), $AQ << \mu m$. Thus, (35) requires $$A << 1 \quad (36)$$

and $$A << \mu_m/Q$$

NUMERICAL RESULTS FOR ABOVE DESCRIBED SIMPLE PARALLEL AND SERIES CIRCUITS

Through conventional equations of motion for the polarization, numerical computations for the modes of cutoff, given by (20), (22), and (23) for the parallel circuit of FIG. 7, and by (25), (26), and (27) for the series circuit of FIG. 8, have been done. Since the case with the earth's field parallel the borehole axis G = A, is only considered, these symbols can be used interchangeably.

The summary of results is as follows. The maximum cutoff efficiency is for $A \simeq \mu_m/Q$, where $\mu_m = 2.33$, for $Q \geq \sqrt{2}$. The cutoff efficiency can be at least $E_m = 0.725$ at any A by appropriate choice of Q (or appropriate $\mu$-value obtained by other means, i.e., allowing a tuned NML coil to ring with appropriate Q following voltage-limited polarizing current cutoff provides a signal at least 0.725 as great as obtained with instantaneous cutoff. The appropriate Q to maximize signal sensitivity of the coil circuit is of the order of 2.33/G, where G is the cutoff rate, $(B_p/B_e)(\omega T)$, where $B_p$ is the polarizing field strength, $B_e$ is the earth's field, and T is the cutoff time. For $A < 1$ an efficiency of $E_m$ is obtainable, and at an A-value of 2.5 an E-value of about 0.80 can be obtained by appropriate choice of Q for simple series or parallel circuits. The initial slope of E as a function of A is $(\tfrac{1}{2})\sqrt{1+Q^2}$ for the series circuit at any A and for the parallel circuit to a reasonable approximation for A greater than about $\sqrt{2}$. If the Q during cutoff is determined by a resistor in parallel with the tuned coil, Q-values approaching that for critical damping ($Q = \tfrac{1}{2}$) are to be avoided.

$\theta$ and $\Psi$ tend to oscillate at an angular rate $0.6 + Q$ as A is increased. $\theta$ tends to oscillate about $\pi/2$ with maxima and minimal at multiples of $A = \pi/(0.6+Q)$. $\Psi$ oscillates with maxima and minimal at odd multiples of half this value.

FIG. 9 shows cutoff efficiencies for a long coil centered in the borehole for various Q values via curves 70. Note that, fortunately, a given Q-value gives reasonable efficiency over a fairly wide range of A'.

Since A' tends to decrease as the inverse square of borehole radius, the illustrated range allows a substantial variation of borehole size and angle between earth's field and borehole axis without necessity of adjusting the ringing Q.

DEPOLARIZATION TO MINIMIZE RESIDUAL POLARIZATION IN A NEXT-IN-TIME COLLECTION CYCLE

In the prior sections, the responses of polarization have been described. In this section, the responses of polarization including residual polarization to various magnetic fields will be discussed for the purpose of showing that for coil circuits having normal Q values for conventional NML operations, components of residual polarization that are precessing in the earth's field ($\overline{B}_e$) can be effectively disposed via their reorientation by a sufficiently slow rising next-in-time polarizing field. After reorientation, the precessing components are then scattered by precession in the aforementioned next-in-time polarizing field after the latter attains maximum field strength.

In this regard, polarization in a static field simply precesses about the latter. The component of polarization parallel to the field is not affected by the latter. The perpendicular component, however, precesses and is the component that generates the NML signal. If the field changes strength without changing direction, the precession frequency $\omega$ changes with the field, but the angle $\theta$ between the polarization $\overline{M}$ and the resultant field ($\overline{B} = \overline{B}_p + \overline{B}_e$) remains unchanged.

Polarization can be manipulated also when a magnetic field changes direction. Different behavior is a function of the speed of change of the field, viz., whether or not it is fast (or sudden), intermediate, or slow (or adiabatic). Intermediate speed is when the instantaneous angular frequency of rotation $\Omega$ of the magnetic field is comparable to the instantaneous precession frequency $\omega$ of the polarization about that field. For fast changes, viz., where $\Omega >> \omega$, the polarization does not have time to adapt to the change in direction of the field. Wherever the polarization happens to be, precessing or not, it simply proceeds to precess around the new field.

There can be any degree of interchange between precessing and non-precessing polarization when there is a sudden change in direction of the magnetic field.

Polarization can be manipulated also by resonant magnetic fields as previously indicated.

The effects of fields near the precession, or "Larmor" frequency can be visualized by considering the system from a rotating reference frame. If we consider a polarization from the viewpoint of a reference frame rotating about a static magnetic field at the precession frequency corresponding to the field, the system appears to behave as if the field were removed. That is, we are rotating with the polarization; so it appears to be standing still. We are now in a position to visualize the effect of a magnetic field rotating at or near the precession frequency. The rotating field simply looks like a static field in the rotating reference frame. The polarization simply precesses in this field. If the frequency is not exactly the precession frequency, then a small part of the static field is uncancelled. As the rotating field is turned on or off, we can have changes of angle of the apparent field in the rotating frame, and the fast, intermediate, or slow effects apply in this frame.

If a rotating field is applied just long enough for precession in the rotating frame by 90°, it is said to be a 90° pulse. Non-precessing polarization in the non-rotating reference frame is thus turned so that it becomes precessing polarization capable of generating a signal.

In actual practice, the rotating field is derived from an oscillating field, which can be regarded as the sum of two fields rotating in opposite directions. The one rotating opposite to the precession direction reverses its effect on the polarization so rapidly that it has no significant effect.

There is some possibility of precessing polarization from one signal cycle surviving the following polarizing cycle, if it is short, making an unwanted contribution to the next signal. Even if the precession frequency varies with position in the formation because of magnetic mineral grains or for other reasons, there is the possibility of unwanted signal contributions from "echoes." The phenomenon arises as follows. If precessing polarization is dispersed in phase by this variation in frequency, and if a polarizing field is applied nonadiabatically, some of the elements of polarization will end up parallel or antiparallel to the polarizing field, depending on their phase at the beginning of turn-on. Since the process, complicated as it is, is linear, the parallel and antiparallel polarization started out with half-integer cycles of phase difference. The remaining polarization precesses in the polarizing field and is thoroughly dispersed, as the field is very strong and inhomogeneous. After polarizing field cutoff part of the polarization resumes precession. After precession for as long as the previous precession time, if diffusion does not significantly change the precession frequency of individual molecules, the half-integer polarization phase differences are doubled to become integer cycles of phase difference. With the surviving polarization back in phase, we have an echo of the previous signal added to the new signal, probably with random relative phase.

But returning to polarization manipulation by directional changes of associated magnetic fields, when the change is slow, viz., when $\Omega << \omega$, the consequence is that the polarization ($\overline{M}$) follows the polarizing field ($\overline{B}_p$) as the field changes direction. Polarization that is parallel to the field, changes direction to remain parallel after application of the latter, and precessing polarization adapts to remain precessing around the new field.

However, while both types of residual prior-in-time polarization usually have to be considered, viz., one must consider both components of polarization that is parallel to the earth's field but which is non-precessing, and that which precesses about the earth's field, I have discovered that the latter has a greater influence provided cutoff of the polarizing field during ringing is not too slow. That is to say, the effect due to the precessing polarization can be the more important. Hence, even though both types can follow the next-in-time polarizing field turn-on (the latter being assumed to be adiabatic), the subsequent scattering is of only the precessing components, that is, scattering by the next-in-time polarizing field after adiabatic turn-on, averting the need for a depolarizing period between collection cycles. It is assumed that non-precessing components parallel to the earth's field can have about as many components parallel as opposed to the earth's field, and as a consequence, any resultant non-precessing polarization parallel to the earth's field will not be large. Thus, its contribution to the next-in-time polarization will be small even though such non-precessing components follow the next-in-time polarizing field.

FIG. 10 illustrates the effect of cutoff rate and field inter-position in detail.

In FIG. 10, the effect of a sudden cutoff of the prior-in-time cycle as a function of angle $\theta$ between the polarization $\overline{M}$ and the earth's field ($\overline{B}_e$) and angle $\phi$ between the polarizing field ($\overline{B}_p$) and the resultant field ($\overline{B}$) is illustrated.

Note that for curve 75 that $\theta$ is nearly equal to $\phi$. Result: with sudden cutoff, nearly as many non-precessing components of residual polarization are parallel to the earth's field as opposed. And even though with slow turn-on for the next-in-time polarizing field, its contribution would be surprisingly small.

However, there also can be an imbalance of components that precess about the earth's field at the start of the next-in-time polarizing period and such components can erroneously contribute to the next-in-time NML signal. But in accordance with the present invention, if the next-in-time polarizing field has the attribute of a slow-rising amplitude vs. time turn-on segment, the prior-in-time precessing residual polarization can be reoriented and then scattered as the residual polarization precesses about the field. The reason for the scattering: the precessional frequency is very high in the presence of the polarizing field and varies rapidly with position. In this regard, the invention requires that such residual polarization that exists within the adjacent formation as the next-in-time polarizing period begins, be able to follow such field over the time sequence defined by the turn-on segment. That is to say, the instantaneous angular frequency of rotation ($\Omega$) of the polarizing field must be much less than instantaneous angular precessional frequency ($\omega$) of the polarization, viz., $\Omega << \omega$. In this regard, ratios of $\omega$ to $\Omega$ in a range of 10 to 100 are satisfactory in establishing the desired character of the polarizing fields used in accordance with the present invention.

Furthermore, note in Eq. (2), supra, that there is indicated a further characteristic of such turn-on segments. That is, if angle $\alpha$ of Eq. (2) is small, the turn-on segment also must define a slow-rising amplitude vs. time characteristic. In other words, if $\alpha<<1$, the precessing residual polarization will follow the buildup of the polarizing field. Scattering then follows as previously discussed.

FIG. 11 shows how the maximum amount of the precessing residual polarization to be scattered, varies as a function of $\Delta\theta$, the absolute limit of angle change between the polarization $\overline{M}$ and the resultant field $(\overline{B})$ as a function of the dimensionless parameter A.

In this regard, note that it can be shown that if the field is turned on at a constant rate and with an abrupt start, the change in angle $\theta$, viz., $\Delta\theta$, oscillates between zero and an angle in the range of $-2A$ to $+2A$ where $\theta$ is the angle between the polarization $\overline{M}$ and the resultant field $(\overline{B})$ and A is a dimensionless parameter proportional to parameter $\alpha$. The change in angle $\theta$ depends on the phase angle $\Psi$ of the polarization $\overline{M}$ about the resultant field $(\overline{B})$ when turn-on is initiated. The oscillation dies out as $\alpha$ decreases with increasing angle $\theta$, leaving a final angle change between $-A$ and $+A$. Computation based on the equations of motion similar to those previously used, indicate that for various A values and initial phases that the largest change in $\theta$ is for initial phase $\Psi$ of approximately $-\tan^{-1}(0.1+1/A)$. In FIG. 11, note if A at some point in the formation is 0.1 as much as ten percent of the precessing polarization could end up in the direction of polarizing field, depending on the phase at the moment of sudden turn-on. However, if A is 0.1 merely at the edge of the borehole, the average with respect to signal contribution would be roughly $A=0.05$ leaving an initial polarization of up to 5% of the previous precessing polarization. Since the fraction of precessing polarization ending up in the direction of the polarizing field varies between the maximum parallel to the maximum opposed (depending on the exact instant of onset of turn-on), it is expected that the net change in $\theta$ can be reduced substantially by a turn-on rate such that the next-in-time field is brought from zero to the maximum field over at least a cycle of precession. For proton precession, a cycle is typically only a half of a millisecond. Hence, very little operational time is lost by such step.

FIG. 12 illustrates details of a signal-forming and driving network 22 for bringing about the slow-rising polarizing field, as required in accordance with the invention.

In FIG. 12, note that the network 22 at the earth's surface includes a function generator comprising a pulse generator 80 connected through a gate 81 and a counter 82 to a D/A convertor 83 capable of generating the required slow-rising polarizing voltage at the downhole coil. In this regard, the output of the convertor 83 is clocked out by the counter 82 at a rate that provides for the needed slow-rising amplitude vs. time polarizing field via the polarizing coil downhole within the sonde, viz., one which $\Omega<<\omega$ is the instantaneous angular frequency of rotation of the polarizing field and $\omega$ is the instantaneous precession frequency of the polarization $\overline{M}$ within the earth's formation adjacent to the wellbore. Counter 82 is preferably provided with a logic gate 84 in its clock circuit so that when the counter reaches 9999 state before reset, gate 81 is deactivated. The ramp of the counter is linear over the buildup segment of the polarizing signal but since it is a function of the pulse rate of pulse generator 80, can be easily reprogrammed if desired.

Thus in effect, the counter 82 provides the network 22 with an appropriate waveform by which the required slow-rising amplitude vs. time polarizing field can be generated downhole, viz., a field that is slow-rising from 0 to several times the strength of the earth's field. The electrical signal output of the D/A convertor 83 that provides such field is, of course, of the required analogous waveform.

In operation, note from FIG. 1, that for much of the polarizing field buildup, $\sin\phi$ is small. From Eq. (2), it can be seen that the rate of buildup can be greatly increased.

Polarization field buildup with constant amplitude corresponds to a constant voltage output from the D/A convertor 83 during buildup. And if the voltage applied to the polarizing coil 35 of FIG. 2 is with time constant $1/\omega_o R$, where R is a dimensionless turn-on rate for voltage, and $\omega_o$ is frequency, the voltage is proportional to $1-\exp(-\omega_o Rt)$. The resulting polarizing field is thus proportional to $t-(1-\exp(-\omega_o Rt))/R\omega_o$, which for small $\omega_o Rt$ is approximately of parabolic form, viz., $(\frac{1}{2})\omega_o Rt^2$.

FIG. 13 illustrates the resulting polarizing field of the present invention as a curve 85 having a slow-rising amplitude vs. time buildup segment 86 of correct characteristics. The strength of the field as defined by the curve 85 is the ordinate while time is the abscissa in milliseconds. Note that the slow-rising segment 86 is a part of the buildup section 87 and plays a dominate role in reducing the effects of residual polarization in accordance with the present invention. The amplitude vs. time characteristics of the segment 86, of course, are determined by solution of the equation previously described and has the greatest change in slope over the initial time frame say from $t=0$ to $t=1$ milliseconds where the slope of the parabolic portion of the equation undergoes the greatest change. I.e., at its vertex at $t=0$, the slope of the segment 86 is zero; thereafter, the slope is more linear say from $t=1$ to $t=5$ milliseconds. The terminus of the segment 86 is seen to define a field that is at least several times greater than the strength of the earth's field. Assuming that the earth's field is $\frac{1}{2}$ gauss, then the slow-rising segment 86 is seen to terminate at a value of about 5 gauss or 10 times the earth's field strength at the time $t=5$. Above $t=5$ milliseconds the rate of rise of the remainder of the buildup section 87 can be very fast without affecting the role played by the segment 86 in reducing the effects of residual polarization.

As in the manner previously explained for substantial ranges of A and R, numerical integrations have been carried out.

Again the change in $\theta$ depends on the starting phase $\Psi_o$, so for each combination of A and R the computation was made over a sufficient range of $\Psi_o$ to determine the maximum change in $\theta$. For change in $\theta$ of a few percent or less, the relationship emerged as $$\Delta\theta_{max} \theta AR/(1+R).$$

FIG. 14 shows the maximum change in $\theta$ as a function of R for $A=1$ and $A=0.5$. The voltage available for polarizing current turn-on is not likely to provide for A large compared to one. The dashed lines correspond to $\Delta\theta = AR$. For $A=1$ and R value of 0.03 reduces the change in $\theta$ to a few percent of a radian. The corresponds to $\frac{1}{2}\pi R=5$ cycles of precession in the earth's field, normally about 2.5 ms. This is an order of magnitude less than the buildup time for the polarizing field in NML. Thus, apply turn-on voltage with a time constant of a few milliseconds will lead to effectively slow polarizing field turn-on in the sense of not changing $\theta$ enough to have previously precessing polarization contribute to a nonzero polarization at the beginning of polarization buildup in the polarizing field.

In implementing effectively slow turn-on, operations that result in ringing the tuned NML coil during turn-on should be avoided.

Hence, a brief discussion of NML coil turn-on is in order and is presented below.

In order to establish the correct coil Q value, the NML tool is placed in a calibration tank in which the coil of the polarizing and detection circuit is surrounded by a section of sand or the like, containing entrained fluids, such as water. Then a polarizing field of known time duration is generated by driving the coil with an electrical signal of known characteristics. Next, the signal is terminated, and the coil circuit is permitted to ring at the proton precession frequency of entrained fluids in the test tank to generate a decaying oscillating resonant magnetic field that propagated outwardly and reorients with enhanced results, the nuclear polarization previously generated by the polarizing field. The enhanced polarization is then detected as an NML signal. Finally, the elements of the coil circuit are varied as the operations are repeated until the detected NML response signal is maximum, usually by changing the value of the resistive element in the coil circuit within a selected range.

In order to establish the correct coil Q value for the invention, the NML tool is placed in a calibration tank, in which the coil of the polarizing and detection circuitry is surrounded by a section of sand or the like, containing entrained fluids, such as water. Then the investigators tune the coil to a Q value that generates an oscillating field during ringing that maximizes the NML signal associated with nuclear polarization established by the dipole moments of the entrained fluid nuclei by a prior-in-time polarizing field of predetermined characteristics. Detection occurs after the polarizing field has been cutoff and ringing of the coil circuit has terminated.

Now in more detail, these steps of include the following:

(a) After the tool has been located within the test tank, a polarizing field having a known time duration, is generated by the polarizing and detection circuitry by driving its associated polarizing coil with an electrical signal of known characteristics;

(b) The electrical signal is then cut off after the time duration of step (a) has elapsed;

(c) Then the coil and associated elements are permitted to ring at a frequency related to the proton precession frequency of entrained fluids common to the adjacent formation to be surveyed, to generate a decaying oscillating resonant magnetic field that propagates outwardly and reorients with enhanced results, the nuclear polarization associated with the generated polarizing field prior to cutoff; and (d) Finally, the Q of the coil and its associated elements that maximizes the NML signal response to the enhanced reoriented polarization of step (c), is determined.

As previously indicated, the coil and its associated elements comprising a portion of the polarizing and detection circuitry during ring down, are connected in circuit with each other so as to provide damping of the oscillating resonant magnetic field radiating from said coil. Such circuit configuration comprises a resistive element in either series connection or parallel connection with a capacitor that is itself parallel to said resistance element, as shown in FIGS. 7 and 8. Of course, the coil and the associated elements themselves define the Q value of step (d) and have particular values related to the proton resonant angular frequency ($\omega$) of the entrained fluids in accordance with, Resonant frequency $(\omega) = [1 - 1/(2Q)^2]^{\frac{1}{2}}$ where Q is the quality value factor determined by step (d), as previously mentioned.

Note that the time duration of the prior-in-time polarizing period that is most likely to influence a subsequent NML signal of a later-in-time collection cycle is such that said prior-in-time polarization period as compared to that of a present-in-time collection cycle of interest, is much longer. In this regard, the time duration of the prior-in-time polarizing period can exceed that of the later-in-time collection cycle by a factor of about 4, say where the former is about 400 milliseconds and the latter is about 100 milliseconds. Other combinations are also possible. For example, the time duration of the prior-in-time polarizing period can even exceed that of the later-in-time collection cycle by a factor of about 20, say where the former is about 2,000 milliseconds and the latter is about 100 milliseconds.

SYMBOLS AND DEFINITIONS SECTION

For convenience, the unit of time is here the reciprocal precession angular frequency in the earth's field (the full earth's field, not merely the component perpendicular to the polarizing field). The unit of angular frequency is the precession angular frequency in the earth's field; the unit of field strength is the strength of the earth's field.

$\omega$ instantaneous local precession angular frequency about the resultant field (vector sum of the earth's field and whatever field is produce at a given time and place by the polarizing coil or whatever coil is being considered).

$\Omega$ instantaneous local angular frequency of turning of the resultant field (rate-of-change of direction irrespective of amplitude).

$\alpha = \Omega/\omega$.

R the ratio of the component of the resultant field parallel to the polarizing field to the component of the earth's field perpendicular to the polarizing field.

$\phi = \cot^{-1} R$; $\phi_e$ is $\phi$ when the polarizing field has been reduced to zero, namely, the angle between the earth's field and the polarizing field.

$\theta$ the instantaneous local angle between the resultant field and the polarization.

Note: A prime (') will frequently be used to indicate some quantity at an arbitrary distance into the formation, whereas the symbol without the prime will indicate the quantity at the edge of the borehole.

A the instantaneous value of $d\phi/dt$ (in units mentioned above) at the time during cutoff at constant rate (or extrapolation thereof) when the resultant field is perpendicular to the polarizing field. $A = -(dR/dt)\sin\phi_e$.

$G = -(dR/dt)\sin\phi_e$. Note that dt is in units of reciprocal precession angular frequency in the earth's field and represents the quantity $\gamma B_e dt$ in more general units. Thus, $G = dB_p/dt$ in our units. G is also the polarizing field (in units of the earth's field) divided by the cutoff time (in units of reciprocal precession angular frequency in the earth's field) for constant cutoff rate. $G = A \sin^2 \phi_c$. Note that A and G are the same when the polarizing field is perpendicular to the earth's field (either locally or, in the case in which the earth's field is parallel to the borehole axis, substantially everywhere).

$\hat{B}_1$ the unit vector in the direction $\hat{B}_e \times \hat{B}_p$.
$\hat{B}_2 = \hat{B}_1 \times \hat{B}_e$.
$\rho$ distance from the borehole axis.
a borehole radius.
$\mu$ angle of rotation in the rotating frame of reference about some axis perpendicular to the earth's field.
E polarizing field cutoff efficiency neglecting relaxation effects, the ratio of the signal following some particular mode of polarizing field cutoff to the signal for instantaneous cutoff. Note that it is not impossible for E to be greater than 1.0.

SIGNAL SENSITIVITY DEPENDENCE ON A

The simplest NML field computation is for the centered "ideal coil", which produces approximately a two-dimensional dipole field. This coil must be long compared to the borehole diameter. The field is perpendicular to the borehole axis, which we will assume to be the direction of the earth's field. The field B is inversely proportional to the square of distance from the axis. Apart from the angles $\theta$ and $\psi$ associated with polarizing field cutoff, the signal contribution from a small volume element is proportional to $B^2$. One factor is for the strength of polarization produced by the field, and the other is for the coupling of the field of the precessing polarization back into the NML coil. Since our computations are for ratios of sensitivities, we will not be concerned with constant multipliers. The sensitivity per unit axial length is proportional to $$dS \sim B^2 \rho d\rho \sim d\rho/\rho^3 \qquad (A-1)$$

The factor of $\rho d\rho$ is proportional to the volume element per unit length. The cutoff rate A is also proportional to B. If $A_{oo}$ is the cutoff rate at the edge of a borehole of radius a for our ideal coil system, $$A = A_{oo} a^2/\rho^2 \qquad (A-2)$$

Differentiating (A-2) and comparing with (A-1) gives $$dS \sim dA \qquad (A-3)$$

This corresponds to $f(A) = 1$ in Equations 4, 5 and 9. If the coil is not long compared to the borehole diameter, the field drops off faster than $1/\rho^2$ for large $\rho$, eventually dropping off as $1/\rho^3$ as for a three-dimensional dipole. We will compute the field for a line dipole extending from $z = -b$ to $z = +b$. We limit the computation to the x-direction in the $z = 0$ plane. The field is $$B \sim \frac{\partial^2}{\partial x^2} \int_{-b}^{+b} dz/\sqrt{x^2 + z^2} \qquad (A-4)$$

$$B \sim \frac{2b(b^2 + 2x^2)}{x^2(x^2 + b^2)^{3/2}}$$

We now define $$u = A_{oo} a^2/x^2 \qquad (A-5)$$

-continued
$$G = A_{oo} a^2/b^2,$$

where $A_{oo}$ is defined in Equation A-2 for the long coil. We no longer have $u = A$, however. We now have $$B \sim A = (u + 2G)/(1 + G/u)^{3/2} \qquad (A-6)$$

We still have $dS \sim B^2 du/u^2$, giving $$f(A)dA = dS = u(u + 2G)^2 du/(u + G)^3 \qquad (A-7)$$

As an example, if the borehole diameter is half the coil length and $A_{oo} = 1.6$ is the cutoff rate at the edge of the borehole for a long coil system with the same winding cross section and current as the short coil, Equation A-2 gives $G = 0.4$, and Equation A-6 gives $A_o = 1.72$. It may at first be surprising that the near field of a short line dipole is greater than that of a long one. However, the field from the more distant part opposes that from the part near the $z = 0$ plane.

All specific embodiments of the invention have been described in detail, and it should be understood that the invention is not limited thereto as many variations will be readily apparent to those skilled in the art. Thus, the invention is to be given the broadest possible interpretation within the terms of the following claims.

E.g., instead of a function generator other circuitry can be used to provide gradual onset of polarizing field buildup, and the choice would be determined by what is convenient to implement. For instance, $1/\omega$ for ordinary 60 Hz power is 2.65 ms. Hence, 60 Hz rectification provides an appropriate time constant for turn-on voltage buildup in accordance with the present invention. The buildup time could be up to a half cycle, namely, 8.3 ms, say 6 or 7 ms. However, it would be important for the connection of the NML polarization coil to the rectified 60 Hz power to be within a few degrees of the zero voltage crossing of the 60 Hz voltage vs. time waveform.

What is claimed is:

1. Method for reducing the effects of precessing residual polarization in nuclear magnetic logging (NML) operations so that a series of collection cycles normalized to a common depth interval can be carried out more swiftly and accurately than in conventional NML operations, wherein the common depth interval lies within an earth formation penetrated by a wellbore adjacent to NML polarizing and detection circuitry positioned within the wellbore under control of NML computer-linked controller and recording system at the earth's surface, and wherein entrained fluids with the common depth interval are repetitively polarized with a polarizing field ($B_p$) at an angle to the earth's field ($B_e$), and after the polarizing field has been cut off, NML signals from precessing protons of fluid nuclei within the formation are detected, comprising (i) identifying which of the time durations of the polarizing periods of a series of collection cycles to be normalized to a given depth interval is most likely to generate precessing residual polarization that will affect the NML signal of a subsequent collection cycle and defining the most likely period as being associated with a prior-in-time collection cycle and defining the affected subsequent cycle as the present-in-time collection cycle;

(ii) positioning the polarizing and detection circuitry within the wellbore adjacent to a common depth interval;

(iii) repetitively polarizing protons of fluids within said common interval by a polarizing field ($B_p$), said polarizing field ($B_p$) having a slow-rising amplitude vs. time turn-on segment, over at least the polarizing period associated with the present-in-time collection cycle, said repetitive polarizations defining the polarizing periods of the series of collection cycles that includes both the present-in-time collection cycle and the prior-in-time collection cycle of step (i), whereby during each collection cycle said polarizing field realigns dipole moments of the fluid nuclei and forms a nuclear polarization at an angle to the earth's field;

(iv) terminating each polarizing period after a known time duration by cutting off the polarizing field at a cutoff rate; and (v) detecting the precessing nuclear polarizations of the series of collection cycles as a series of NML signals, said series of collection cycles includes said present-in-time and said prior-in-time collection cycles whereby a detected NML signal associated with the present-in-time collection cycle is not influenced by precessing residual polarization initially in evidence at the start of the present-in-time polarizing period because the slow-rising turn-on segment of the polarizing field causes the precessing residual polarization to undergo reorientation to a direction that is parallel to said polarizing field, and subsequent be scattered by precession about that field whereby said logging operations can be swiftly and accurately carried out without need of a depolarization period between said next-in-time and prior-in-time collection cycles.

2. Method of claim 1 in which the slow-rising amplitude vs. time turn-on segment of said polarizing field of said present-in-time cycle has an instantaneous angular frequency of rotation that is much smaller than the instantaneous precession frequency of the precessing residual polarization associated with the prior-in-time cycle normalized to the depth interval of interest.

3. Method of claim 2 in which the instantaneous frequency of rotation of the polarizing field is $\Omega$ and the instantaneous precession frequency of the precessing residual polarization is $\omega$ and $\Omega << \omega$.

4. Method of claim 3 in which the ratio of $\omega$ to $\Omega$ is in a range of 10 to 100.

5. Method of claim 2 in which the amplitude of the turn-on segment is proportional to $$t - (1 - \exp(-\omega_0 Rt))/R\omega_0$$

where $\omega_0$ is frequency, t is time, and R is a dimensionless turn-on rate for an electrical signal that drives said polarizing and detection circuitry within the wellbore during turn-on.

6. Method of claim 2 in which step (iv) is further characterized: after each polarizing period, permitting a coil of said polarizing and detection circuitry used to generate said polarizing field ($B_p$) to define a resonant coil circuit having a selected Q value after cutoff of the polarizing field ($B_p$) so as to allow said resonant coil circuit to undergo ringing and generate a decaying oscillating resonant magnetic field that propagates outwardly and reorients with enhanced results, the nuclear polarization of said entrained fluids associated with said polarizing field.

7. Method of claim 6 in which step (iv) is further characterized by precessor steps in which said selected Q value of the resonant coil circuit of the polarizing and detection circuitry is established prior to ring down by the substeps of:

(A) generating a polarizing field having a known time duration by driving the polarizing coil with an electrical signal of known characteristics;

(B) cutting off the signal after the known time duration of step (A) has elapsed;

(C) permitting the coil circuit to ring at the proton precession frequency of entrained fluids common to the adjacent formation to be surveyed, to generate a decaying oscillating resonant magnetic field that propagates outwardly and reorients with enhanced results, the nuclear polarization associated with said polarizing field prior to cutoff; and (D) determining the Q of the coil circuit that maximizes the NML signal response to the enhanced reoriented polarization of step (C).

8. Method of claim 6 in which said resonant coil circuit that rings includes associated circuit elements connected in circuit with each other and said coil so as to provide damping of the oscillating resonant magnetic field radiating from said coil after cutoff of said polarizing field and comprises a resistive element in one of (i) series connection and (ii) parallel connection with a capacitor parallel to said coil, said coil and said associated elements having values defining said selected Q value and wherein said Q value is related to the proton resonant angular frequency ($\omega$) of the nuclear polarization in accordance with, $$\text{Resonant frequency } (\omega) = [1 - 1/(2Q)^2]^{\frac{1}{2}}$$

where Q is the selected Q value that permits enhanced ringing by the coil and its associated elements.

9. Method of claim 8 in which said coil and said associated elements are connected in a series damping configuration wherein said resistive element is in series with said capacitor and wherein said capacitor and said resistive element are parallel to said coil.

10. Method of claim 9 wherein said Q is established by varying the resistance value of said resistive element in series with said capacitor to establish the Q value for maximum NML response.

11. Method of claim 8 in which said coil and its elements are connected in a parallel damping configuration wherein said resistive element is in parallel with said capacitor and said coil.

12. Method of claim 11 wherein said Q is established by varying the resistance value of said resistive element in parallel with said capacitor until the value for maximum NML response is established.

13. Method for reducing the effects of precessing residual polarization in nuclear magnetic logging (NML) operations associated with a common depth interval in an earth formation that uses repetitive enhancement of the prior reoriented dipole moments of protons of fluids in the formation adjacent to a wellbore penetrating the formation wherein during each collection cycle, a portion of the collapsing polarizing fluid ($B_p$), after cutoff, is used to reorient said moments relative to the earth's field ($B_e$) using a coil circuit of a polarizing and detection circuit positioned within the wellbore under control of computer-linked controller and recording system at the earth's surface, said coil circuit being caused to ring by said collapsing field at a selected Q value and generate an oscillating decaying magnetic field to favorably positioned said moments at an angle to the earth's field ($B_e$) so that after precession of the moments about the earth's field and generation of detectable NML signals have occurred, operations can be carried out more swiftly and accurately than in conventional NML operations, comprising (i) identifying which of the time durations of the polarizing periods of a series of collection cycles to be normalized to a given depth interval is most likely to generate precessing residual polarization that will affect the NML signal of a subsequent collection cycle and defining the most likely period as being associated with a prior-in-time collection cycle and defining the subsequent cycle as a present-in-time collection cycle;

(ii) positioning the polarizing and detection circuitry that includes said coil circuit within the wellbore adjacent to a common depth interval of interest;

(iii) repetitively polarizing protons of fluids within said common interval by a polarizing field ($B_p$) that for at least the polarizing period associated with the present-in-time collection cycle, has a slow-rising amplitude vs. time turn-on segment, said repetitive polarizations defining the polarizing periods of the series of collection cycles that includes both the present-in-time collection cycle and the prior-in-time collection cycle of step (i), whereby during each collection cycle said polarizing field realigns dipole moments of the fluid nuclei and forms a nuclear polarization at an angle to the earth's field;

(iv) terminating each polarizing period after a known time duration by cutting off the polarizing field at a cutoff rate and permitting said coil circuit to ring at a frequency related to that of the precession frequency of the entrained fluids adjacent to the wellbore; and (v) detecting the precessing nuclear polarizations of the series of collection cycles as a series of NML signals, said series of collection cycles includes said present-in-time and said prior-in-time collection cycles whereby a detected NML signal is not influenced by precessing residual polarization initially in evidence at the start of the present-in-time polarizing period whereby said logging operations can be swiftly and accurately carried out without need of a depolarization period between said next-in-time and prior-in-time collection cycles.

14. Method of claim 13 in which the slow-rising amplitude vs. time turn-on segment of said polarizing field of step (iii) has an instantaneous angular frequency of rotation that is much smaller than the instantaneous precession frequency of the precessing residual polarization associated with the prior-in-time cycle normalized to the depth interval of interest.

15. Method of claim 14 in which the instantaneous frequency of rotation of the polarizing field is $\Omega$ and the instantaneous precession frequency of the precessing residual polarization is $\omega$ and $\Omega << \omega$.

16. Method of claim 15 in which the ratio of $\omega$ to $\Omega$ is in a range of 10 to 100.

17. Method of claim 14 in which the amplitude of the turn-on segment is proportional to $$t - (1 - \exp(-\omega_o Rt))/R\omega_o$$

where $\omega_o$ is frequency, t is time, and R is a dimensionless turn-on rate for an electrical signal that drives said coil circuit within the wellbore during turn-on.

18. Method of claim 14 in which the detected NML signal of step (v) is not influenced by precessing residual polarization owing to the fact that the slow-rising turn-on segment of the polarizing field of step (iii) causes the precessing residual polarization to undergo reorientation to a direction that is parallel to said polarizing field, and the subsequent strength of the field ($B_p$) causes the precessing residual polarization to be scattered by precession about that field.

19. Method of claim 18 in which said selected Q value of the polarizing and detection circuitry is established by the substeps of:

(A) generating a polarizing field having a known time duration by driving the polarizing coil with an electrical signal of known characteristics;

(B) cutting off the signal after the time duration of step (A) has elapsed;

(C) permitting the coil and associated elements to ring at the proton precession frequency of entrained fluids common to the adjacent formation to be surveyed, to generate a decaying oscillating resonant magnetic field that propagates outwardly and reorients with enhanced results, the nuclear polarization associated with said polarizing field prior to cutoff; and (D) determining the Q of the coil and its associated elements that maximizes the NML signal response to the enhanced reoriented polarization of step (C).

20. Method of claim 14 in which said computer-linked controller and recording system at the earth's surface comprises internal improvements that enhance the detected NML signals at the end of each collection cycle of said series of cycles normalized to the same common depth interval at a rapid rate but there is no need to provide for a separate time period between collection cycles for such enhancement activity.

21. Method of claim 20 in which said improvements in said computer-linked controller and recording system include at least a signal improvement chosen from the group comprising software, hardware and firmware improvements.

22. Method of claim 14 in which said computer-linked controller and recording system at the earth's surface includes a signal forming network for driving said polarizing coil with said electrical signal of known characteristics during turn-on wherein said polarizing field for at least the polarizing period associated with the present-in-time collection cycle, has a slow-rising amplitude vs. time turn-on segment.

23. Method of claim 22 in which said signal forming network includes a pulse generator connected through a selectively operating counter to a D/A convertor for generating said electrical signal of desired characteristics during turn-on.

24. Method of claim 23 in which said electrical signal of desired characteristics during turn-on is a voltage proportionial to $$1 - \exp(-\omega_o Rt)$$

where $\omega_o$ is frequency, t is time, and R is a dimensionless turn-on rate for said voltage.

* * * * *